(12) United States Patent
Sueyoshi et al.

(10) Patent No.: US 7,272,715 B2
(45) Date of Patent: Sep. 18, 2007

(54) COMMUNICATIONS METHOD, DATA PROCESSING APPARATUS, AND PROGRAM

(75) Inventors: Masahiro Sueyoshi, Kanagawa (JP); Fumio Kubono, Tokyo (JP); Kei Tateno, Tokyo (JP)

(73) Assignee: Sony Corporation, Tokyo (JP)

( * ) Notice: Subject to any disclaimer, the term of this patent is extended or adjusted under 35 U.S.C. 154(b) by 784 days.

(21) Appl. No.: 10/451,160

(22) PCT Filed: Oct. 30, 2002

(86) PCT No.: PCT/JP02/11275

§ 371 (c)(1),
(2), (4) Date: Jun. 30, 2003

(87) PCT Pub. No.: WO03/038627

PCT Pub. Date: May 8, 2003

(65) Prior Publication Data

US 2004/0098587 A1 May 20, 2004

(30) Foreign Application Priority Data

Oct. 31, 2001 (JP) ............................. 2001-335650

(51) Int. Cl.
*G06F 1/24* (2006.01)
(52) U.S. Cl. ...................... 713/156; 713/161; 713/162; 713/168; 713/182
(58) Field of Classification Search ................ 713/153, 713/161, 162, 168, 182
See application file for complete search history.

(56) References Cited

U.S. PATENT DOCUMENTS 4,670,857 A * 6/1987 Rackman .................... 705/51
5,343,527 A * 8/1994 Moore ........................ 713/179
5,473,690 A 12/1995 Grimonprez et al.
6,237,849 B1 5/2001 Cooper et al.

FOREIGN PATENT DOCUMENTS

| JP | 63-253452 | 10/1988 |
|----|-----------|---------|
| JP | 7-121638 | 5/1995 |
| JP | 7-134547 | 5/1995 |
| JP | 8-7001 | 1/1996 |
| JP | 2000-307567 | 11/2000 |
| JP | 2001-22271 | 1/2001 |
| JP | 2001-273428 | 10/2001 |
| JP | 2001-290774 | 10/2001 |
| WO | WO98/02854 | 1/1998 |
| WO | WO98/37525 | 8/1998 |
| WO | WO99/11019 | 3/1999 |

OTHER PUBLICATIONS

Hideru Yamaguchi et al.: "Joho security" bit separate volume, Kyoritsu Shuppan Co., Ltd., pp. 187-196, Jan. 5, 2000.

(Continued)

*Primary Examiner*—Thomas R. Peeso
(74) *Attorney, Agent, or Firm*—Oblon, Spivak, McClelland, Maier & Neustadt, P.C.

(57) ABSTRACT

When transferring elements APE forming an application program between SAM units 9a and 9b, management data which specifies identification data of elements, presence of mutual authentication, mode of reference (usage), and a mutual authentication key of each element is prepared and the elements transferred between the SAM units A and 9b based on the management data.

20 Claims, 27 Drawing Sheets

OTHER PUBLICATIONS

Takeoki Toyota: "Anzen na virtual community o enshutsu suru ninsho technology" Computer and Network Lan, Ohmsha, Ltd., vol. 15, No. 10, pp. 12-16 Oct. 1, 1997.

Mamoru Maeda et al.: "Bunsan operating system" Kyoritsu Shuppan Co., Ltd., pp. 177-186, 241-264 Dec. 25, 1991.

Satoshi Yoshikawa: "Cookie no riyo o kangaeru" Open Design, CQ Publishing Co., Ltd., vol. 6, No. 1, pp. 46-67 Feb. 1, 1999.

Tadatoshi Hirono: "Active web page de sa o tsukero" internet ASCII98, Ascii Corp., vol. 3, No. 4, pp. 390-393 Apr. 1, 1998.

* cited by examiner

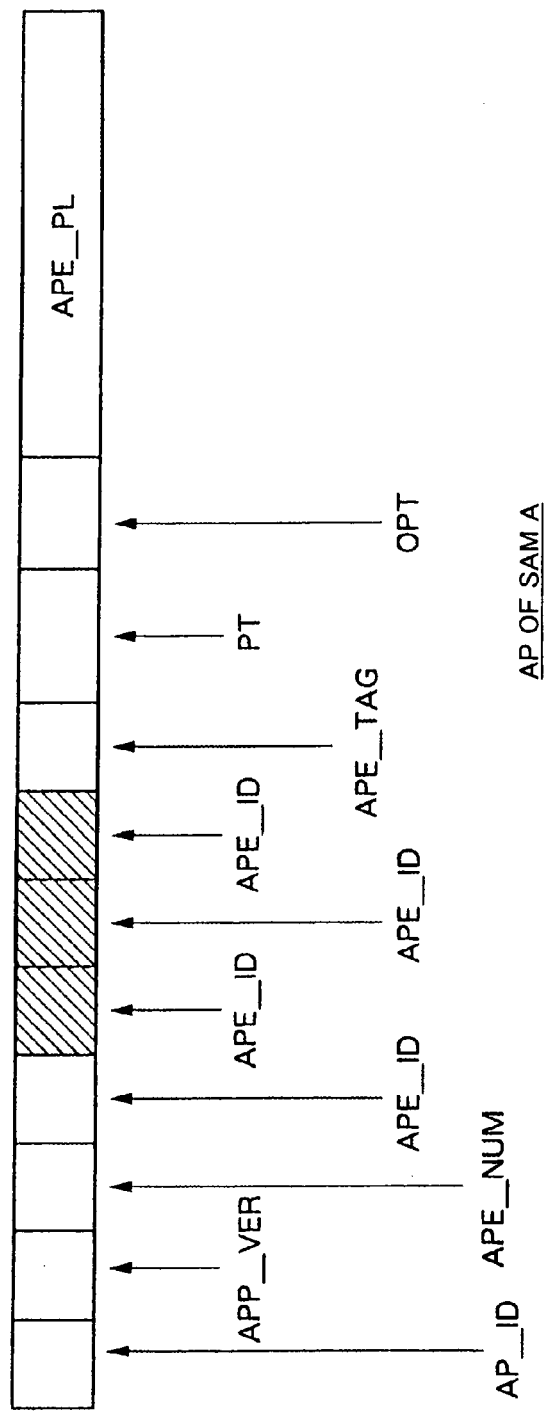

FIG.7A

| NUMBER OF MUTUAL AUTHENTICATION KEYS | PRESENCE OF MUTUAL AUTHENTICATION | INSTANCE OF MUTUAL AUTHENTICATION KEY OF SAM_A | MUTUAL AUTHENTICATION KEY APE OF SAM_A | INSTANCE OF MUTUAL AUTHENTICATION KEY OF SAM_B | MUTUAL AUTHENTICATION KEY APE OF SAM_B | PMSD |

| SAM_ID OF SAM_B | AP_ID (B) | PCF |

← OPT

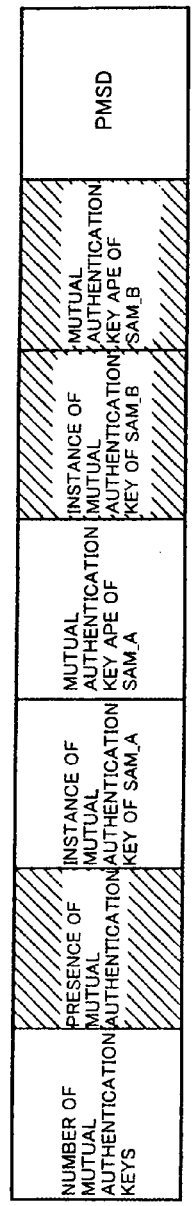
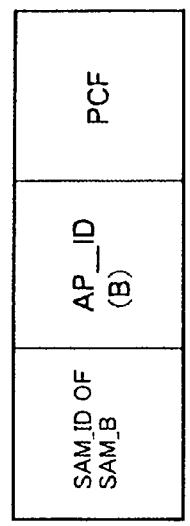
FIG.9A
FIG.9B

FIG.10

| AP RESOURCE ELEMENT TYPE NUMBER | TYPES OF APE | |
|---|---|---|
| 0x0001 | AP RESOURCE KEY K_APR | |
| 0x0002 | IC SYSTEM KEY | ⎫ |
| 0x0003 | IC PARTITION KEY | ⎪ |
| 0x0004 | IC AREA KEY | ⎬ KEYS FOR IC ACCESS |
| 0x0005 | IC SERVICE KEY | ⎪ |
| 0x0006 | IC DEGENERATE KEY | ⎭ |
| 0x0007 | KEY REFERRED TO BY MACRO SCRIPT | |
| 0x0008 | FILE SYSTEM INFORMATION (E.G. LOG, NEGATIVE, JOURNAL) | |
| 0x0009 | FAULT RECORDING JOURNAL FILE | |
| 0x000A | FILE SYSTEM SIGNATURE KEY FILE | |
| 0x000B | SAM MGR MUTUAL AUTHENTICATION | |
| 0x000C | SAM MUTUAL AUTHENTICATION KEY RELATED (FOR AP MUTUAL AUTHENTICATION IN SAME SAM AS WELL) | |
| 0x000D | SAM KEY PACKAGE KEY (PACKAGE KEY) | |
| 0x000E | MACRO SCRIPT | |
| 0x000F | MANUFACTURING KEY PACKAGE | |
| 0x0010 | EXPANSION ISSUANCE KEY PACKAGE | |
| 0x0011 | ISSUANCE KEY PACKAGE | |
| 0x0012 | MEMORY PARTITION KEY PACKAGE | |
| 0x0013 | MEMORY PARTITION BASE KEY PACKAGE | |
| 0x0014 | AREA REGISTRATION KEY PACKAGE | |
| 0x0015 | AREA DELETION KEY PACKAGE (INTERNAL GENERATION) | |
| 0x0016 | AREA REGISTRATION KEY (INTERNAL GENERATION) | |
| 0x0017 | SERVICE DELETION KEY PACKAGE (INTERNAL GENERATION) | |
| 0x0018 | KEY CHANGE PACKAGE (INTERNAL GENERATION) | |
| 0xff00 | MANUFACTURE KEY | |

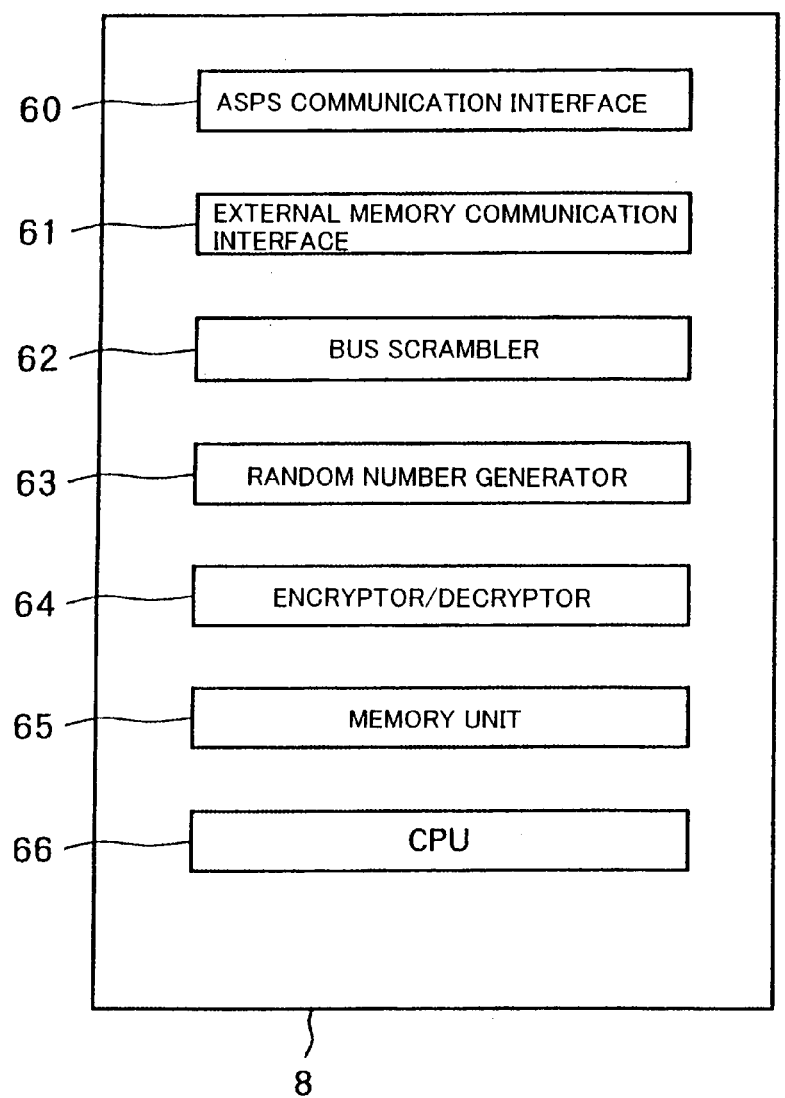

FIG.15

| APE_TYPE | DETAILS OF ELEMENT ATTRIBUTES | |
|---|---|---|
| | ITEMS REQUIRED FOR SETTING AT TIME OF TRANSFER REQUEST | ITEMS AT TIME OF RETURN OF TRANSFER |
| AREA SERVICE KEY | SYSTEM CODE, AREA/SERVICE CODE, ELEMENT VERSION | AREA/SERVICE KEY |
| DEGENERATE KEY | SYSTEM CODE, NUM OF AREA, AREA CODE LIST, AREA KEY VERSION LIST, NUM OF SERVICE(N), SERVICE CODE LIST, SERVICE KEY VERSION LIST | GROUP SERVICE KEY, USER SERVICE KEY |
| MEMORY PARTITION PKG | ELEMENT TAG, ELEMENT VERSION | PARTITION PKG |
| MEMORY PARTITION BASE PKG | ELEMENT TAG, ELEMENT VERSION | PARTITION BASE PKG |
| EXPANSION ISSUANCE PKG | NEW SYSTEM CODE, PACKAGE VERSION(NEW SYSTEM KEY VERSION) | EXPANSION ISSUANCE PKG |
| ISSUANCE PKG | NEW SYSTEM CODE, PACKAGE VERSION(NEW SYSTEM KEY VERSION) | ISSUANCE PKG |
| AREA SERVICE REGISTRATION PKG | SYSTEM CODE, AREA/SERVICE CODE, PACKAGE VERSION(AREA/SERVICE KEY VERSION) | AREA/SERVICE REGISTRATION PKG |
| AREA SERVICE DELETION PKG | SYSTEM CODE, AREA/SERVICE CODE, PACKAGE VERSION(AREA/SERVICE KEY VERSION) | AREA/SERVICE DELETION PKG |

FIG.25

| AREA | KEY |
|---|---|
| DATA A | 1 2 3 4 5 6 7 8 h (KEY A) |

FIG.26

| AREA | KEY |
|---|---|
| DATA B | 56789ABCh (KEY B) |

FIG.27

| INFORMATION TYPE | ATTRIBUTE | AREA | CONTENT |
|---|---|---|---|
| IC CARD ACCESS KEY | OWN | DATA A | 12345678h (KEY A) |
| IC CARD ACCESS KEY | READER/WRITER B | DATA B | 56789ABCh (KEY B) |
| IC CARD PROCESSING DATA | OWN | PROCESSING DATA A | 23456789h |

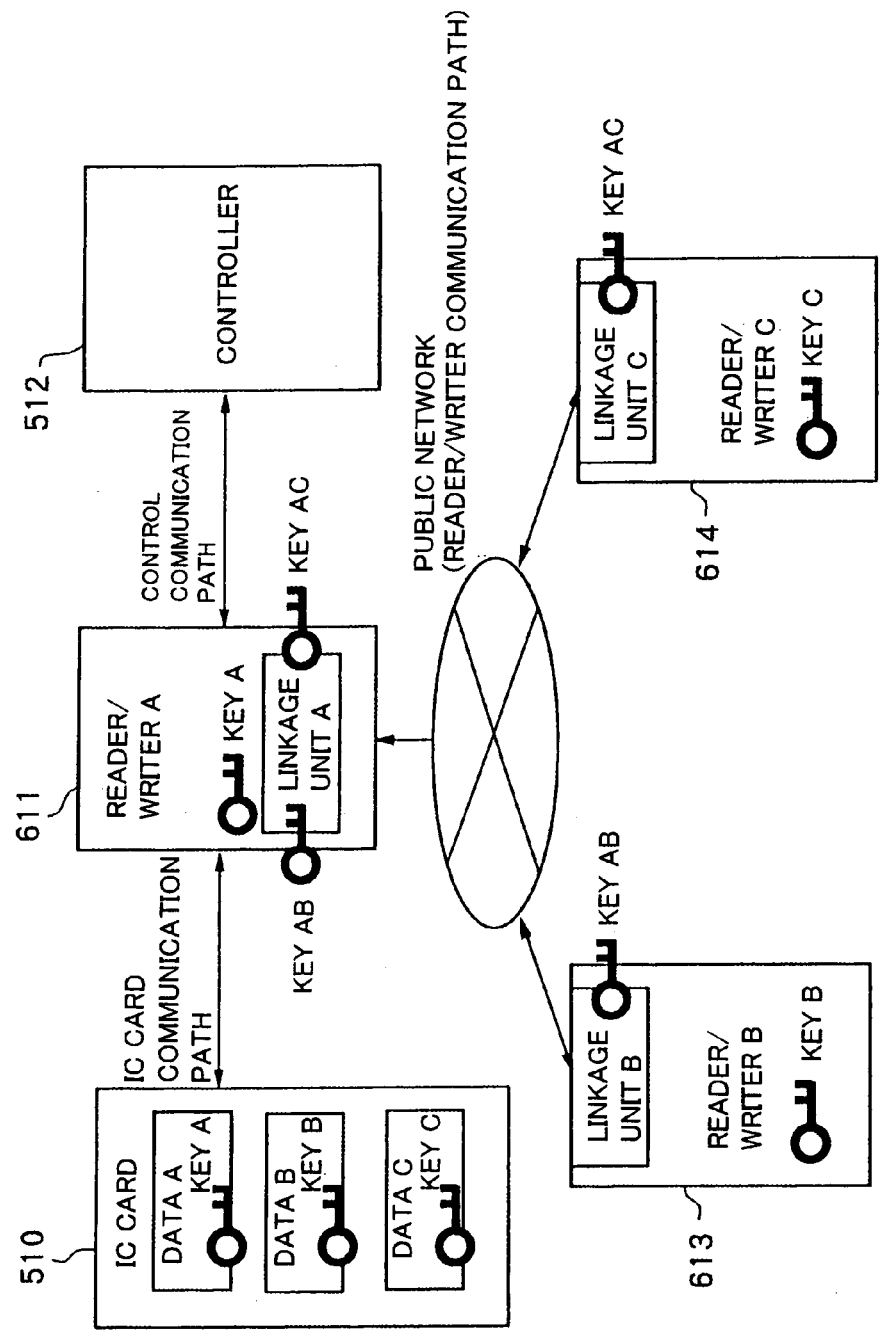

US 7,272,715 B2

COMMUNICATIONS METHOD, DATA PROCESSING APPARATUS, AND PROGRAM

TECHNICAL FIELD

The present invention relates to a communications method, a data processing apparatus, and a program thereof which are used for providing services using an IC or other integrated circuit.

BACKGROUND ART

At the present time, communications systems using IC cards for transactions through the Internet or other networks are being developed.

In such communications systems, application programs receiving requests from service providers for providing services using IC cards and executing processing defined by the service providers are executed by a server apparatus.

In response to a processing request, for example, from a reader/writer or a PC (personal computer), the server apparatus performs processing such as user authentication and data encryption and decryption based on the above application programs.

Services using IC cards as described above are performed using SAMs (secure application modules). There is a demand for quickly providing a service by a plurality of SAMs linked together when a plurality of SAMs link up to provide a service using a single IC card.

Further, in this case, there is a demand for suitably managing data to be kept confidential from other parties and data to be disclosed to the public among SAMs storing data and programs relating to provision of services by different service businesses.

DISCLOSURE OF THE INVENTION

The present invention has as its object to provide a communications method, a data processing apparatus, and a program thereof enabling provision of quick service by a plurality of SAMs (data processing apparatuses) linked up.

Moreover, the present invention has as its object to provide a communications method, a data processing apparatus, and a program thereof enabling suitable management of data to be kept confidential from other parties and data to be disclosed to the public among SAMs storing data and programs relating to provision of services by different service businesses.

To achieve the above objects, a communications method according to a first aspect of the invention is a data processing method for transferring data between a first data processing apparatus executing a first application program and a second data processing apparatus executing a second application program, comprising the steps of: when said first data processing apparatus holds first management data indicating a data module which said first application program uses among a plurality of data modules forming said second application program and said second data processing apparatus holds second management data indicating a data module allowed to be used for said first application program, referring to said first management data and sending a request designating said data module intended to be used to said data processing apparatus by said first data processing apparatus and referring to said second management data in accordance with said request and, when judging that said data module designated by said request is allowed to be used by said first application program, sending the data module specified in said request to said first data processing apparatus by said second data processing apparatus.

Further, the communications method of the first aspect of the invention preferably further comprises, when said first data processing apparatus is connected to a first server apparatus, said second data processing apparatus is connected to a second server apparatus, and said first data processing apparatus and said second data processing apparatus communicate via said first server apparatus and said second server apparatus, having said first server apparatus send said first data processing apparatus a first request and having said first server apparatus refer to said first management data in accordance with said first request and send a second request designating said data module intended to be used to said second data processing apparatus.

Further, the communications method of the first aspect of the invention preferably further comprises having said second server apparatus confirm whether said data module to be use by said first application program is in a condition usable in said second data processing apparatus and notifies the confirmed result to said first server apparatus and having said first server apparatus send said first request in accordance with said notification to said first data processing apparatus.

A data processing apparatus of a second aspect of the invention is a data processing apparatus for transferring data with another data processing apparatus executing a first application program and for executing a second application program, comprising an interface for transferring data with said other data processing apparatus, a memory means for storing a plurality of data modules forming said second application program and management data indicating a data module allowed to be used in said first application program, and a processing means for referring to said management data in accordance with a request from said other data processing apparatus and, when judging a data module relating to said request is permitted to be used by said first application program, reading out the data module relating to said request from said memory means and sending it to said other data processing apparatus.

A program of a third aspect of the invention is a program to be executed by a data processing apparatus for transferring data with another data processing apparatus executing a first application program and for executing a second application program, comprising a routine receiving from said other data processing apparatus a request for use of a data module, a routine referring to management data indicating a data module permitted to be used by said first application program in accordance with said request and judging whether to permit said first application program to use the data module relating to said request, and a routine sending a data module relating to said request to said other data processing apparatus when judging it permissible.

An information processing system of a fourth aspect of the invention is an information processing system comprised of a recording means having a plurality of data (storage medium) and access apparatus for accessing data in said recording means, wherein said recording means has recording means key information linked with the plurality of data, said access apparatus has access key information linked with said recording means key information in accordance with the same or a specific algorithm, said access key information includes access apparatus specifying information for specifying an access apparatus owning the same, said access apparatus has a linkage communicating means able to communicate with a plurality of other access apparatuses, when said access apparatus accesses data in said recording means, if the access apparatuses in said access apparatus specifying information are a plurality of other access apparatuses, access key information corresponding to the above data is obtained from the linkage communicating means, access processing information processing said access key information in accordance with a specific access algorithm is transmitted from the access apparatus to said recording means, said recording means processes the access processing information based on a specific algorithm, and later access from said access apparatus is allowed only when the result linked with the recording means key information of corresponding data in said recording means is obtained.

In the information processing system according to the fourth aspect of the invention, preferably said access apparatus mounts said access key information and said access algorithm on an identical semiconductor chip so analysis and tampering from the outside are difficult.

In the information processing system according to the fourth aspect of the invention, preferably said specific access algorithm is based on one or more decryption algorithms among DES, RSA, AES, and elliptic encryption.

In the information processing system according to the fourth aspect of the invention, preferably said communication path between access apparatuses by the linkage communicating means is encrypted by a specific algorithm.

In the information processing system according to the fourth aspect of the invention, preferably said specific algorithm is based on one or more decryption algorithms among DES, RSA, AES, and elliptic encryption.

In the information processing system according to the fourth aspect of the invention, preferably, in the access apparatus, it is possible to select whether the access key information obtained from a plurality of other access apparatuses is to be held permanently or held temporarily.

In the information processing system according to the fourth aspect of the invention, preferably communication between the recording means and the access apparatus is by composite connection of one or more of wireless connection by radio waves, electrical wired connection, and optical connection.

In the information processing system according to the fourth aspect of the invention, preferably communication between the access apparatus and the plurality of other access apparatuses is composite connection of one or more of wireless connection by radio waves, electrical wired connection, and optical connection.

The information processing system according to the fourth aspect of the invention is preferably a secure information processing system comprising a controller for controlling the access apparatus based on a determined protocol, the access apparatus, and the recording means.

BRIEF DESCRIPTION OF THE FIGURES

FIG. 6 is a view for explaining an application program in a referrer shown in FIG. 5.

FIG. 7A and FIG. 7B are views for describing details of data PT and OPT shown in FIG. 6.

FIG. 9A and FIG. 9B are views for describing details of data PT and OPT shown in FIG. 8.

FIG. 10 is a view for explaining types of application element data APE.

FIG. 11 is a functional block diagram of a SAM module shown in FIG. 1.

FIG. 15 is a view for explaining element attributes shown in FIG. 14.

FIG. 25 is a view for explaining another embodiment of the present invention.

FIG. 26 is a view for explaining another embodiment of the present invention.

FIG. 27 is a view for explaining another embodiment of the present invention.

FIG. 28 is a view for explaining another embodiment of the present invention.

BEST MODE FOR CARRYING OUT THE INVENTION

Below, the best mode for carrying out the invention will be described with reference to the accompanying drawings.

Figure 1:
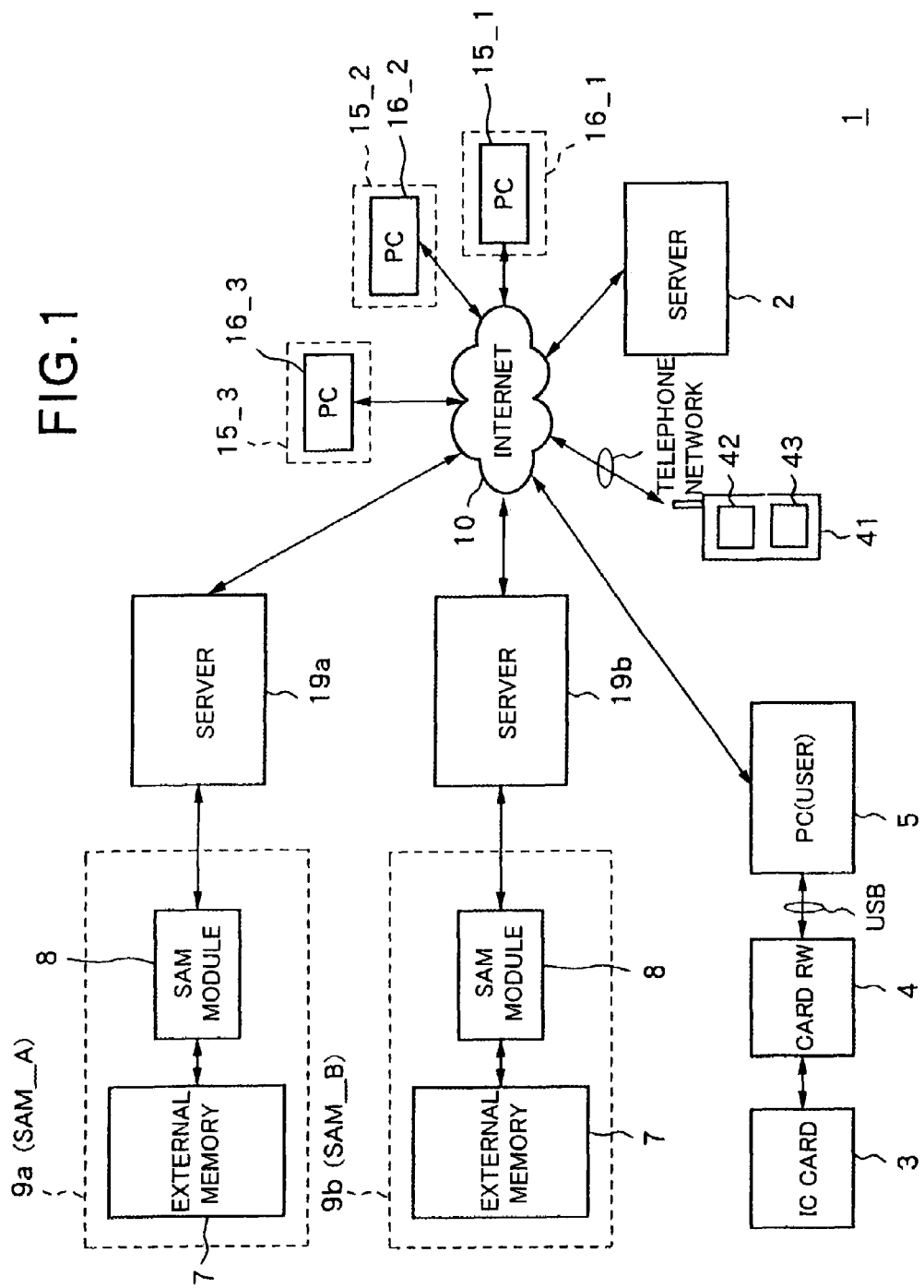
FIG. 1 is a view of the overall configuration of a communications system according to the present embodiment.

FIG. 1 is a view of the overall configuration of a communications system 1 of the present embodiment.

As shown in FIG. 1, the communications system 1 uses a server apparatus 2 installed in a store or the like, an IC card 3, a card reader/writer 4, a personal computer 5, an ASP (application service provider) server apparatus 19, SAM (secure application module) units 9a, 9b, and a mobile communications device 41 having an IC module 42 (integrated circuit in the present invention) built in so as to communicate via the Internet 10 and perform settlement processing and other procedural processing using an IC card 3 or mobile communications device 41.

The SAM unit 9a (first data processing apparatus of present invention) has an external memory 7 (memory means of present invention) and a SAM module 8 (processing means of present invention).

Further, the SAM unit 9b (second data processing apparatus of present invention) similarly has an external memory 7 and a SAM module 8.

The SAM module 8, according to need, transfers data with another not shown SAM module.

[Features of Communications System 1]

In the present embodiment, the SAM unit 9a shown in FIG. 1 is characterized in the communication between the SAM unit 9a and the SAM unit 9b when utilizing the application element data APE stored in the external memory 7 of the SAM unit 9b.

For example, to use the SAM units 9a, 9b for different service businesses to provide services linked together, it is necessary to give another service business a card access key and card issuance key package required for IC card (IC module) operations in a secret state.

For example, to calculate mutual authentication keys with an IC card between different service businesses, it is required to obtain a card access key, card degenerate key, or other key information.

Specifically, when settling money by the SAM unit 9a and purchasing merchandise by the SAM unit 9b and further completing both processing during one mutual authentication period with an IC card, it is necessary to transfer key information necessary for the monetary settlement from the SAM unit 9a to the SAM unit 9b and create a key necessary for access to the IC card at the SAM unit 9b side.

In this case, it is possible for the SAM unit 9a and the SAM unit 9b to individually access the IC card, however, it becomes difficult to guarantee simultaneity of operation and processing for both the monetary settlement and merchandise purchase. For example, a situation arises that the monetary settlement is completed, but acquisition of the merchandise is not completed.

Moreover, a business borrowing a shared memory area of an IC card to provide a service independently has to acquire key information for registering the service on the IC card (area registration key package etc.) from a manager of the shared memory area (memory managing organization) for example.

Also, it is necessary to transfer a card partition key package for logically partitioning an IC card to generate a shared memory area between the memory managing organization and shared area provider (for example, service business).

When a plurality of businesses provide services linked together as explained above and transfer key packages and other application element data APE, the communications system 1 provides a means enabling simple establishment of a secure communications path among the SAM units 9a and 9b and other SAM units.

Below, the components shown in FIG. 1 will be described.

[IC Card 3 and Mobile Communications Device 41]

Figure 2:
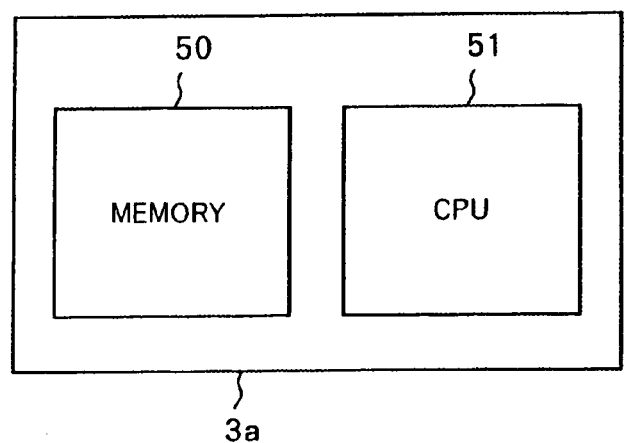
FIG. 2 is a functional block diagram of an IC card shown in FIG. 1.

FIG. 2 is a functional block diagram of an IC card 3.

As shown in FIG. 2, the IC card 3 has a IC (integrated circuit) module 3a having a memory 50 and a CPU 51.

Figure 3:
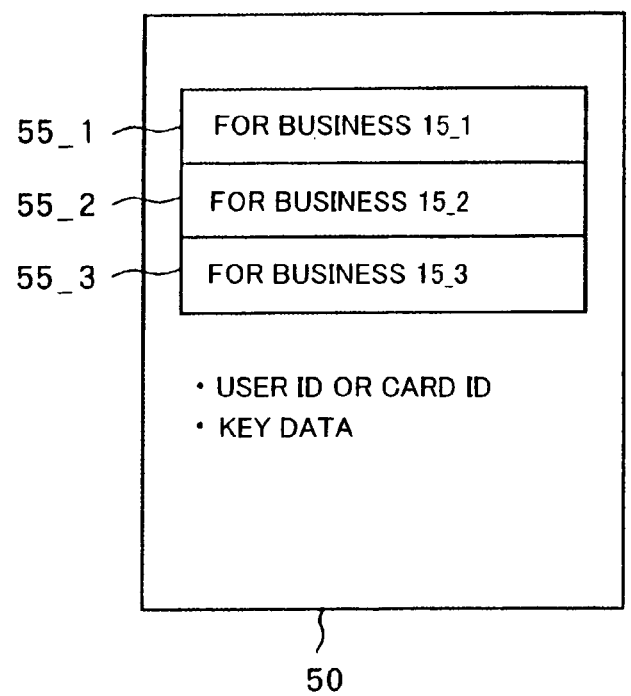
FIG. 3 is a view for explaining a memory shown in FIG. 2.

The memory 50, as shown in FIG. 3, has a memory area 55_1 which a credit card company or other service business 15_1 uses, a memory area 55_2 which a service business 15_2 uses, and a memory area 55_3 which a service business 15_3 uses.

The memory 50 stores key data used for judging an access right to the memory area 55_1, key data used for judging an access right to the memory area 55_2, and key data used for judging an access right to the memory area 55_3. The key data are used for mutual authentication and data encryption and decryption.

The memory 50 also stores identification data of the IC card 3 or IC card 3 user.

The mobile communications device 41 has a communications processor 43 for communicating with an ASP server through a mobile phone network and the Internet 10 and an IC module 42 able to transfer data with the communications processor 43 and communicates with the SAM unit 9a through the Internet 10 from an antenna.

The IC module 42 has identical functions to the IC module 3a in the IC card 3 described above for the point that it transfers data with the communications processor 43 of the mobile communications device 41.

Note that processing using the mobile communications device 41 is performed in the same way as processing using the IC card 3, and processing using the IC module 42 is performed in the same way as processing using the IC module 3a, so in the following description, processing using the IC card 3 and IC module 3a is illustrated.

Below, the SAM units 9a, 9b will be described in detail.

The SAM units 9a, 9b, as described above, have external memories 7 (memory means of present invention) and SAM modules 8 (processing means of present invention).

Here, the SAM module 8 may be realized as a semiconductor circuit and may be realized as an apparatus holding a plurality of circuits in a housing.

[Software Configuration of SAM Module 8]

Figure 4:
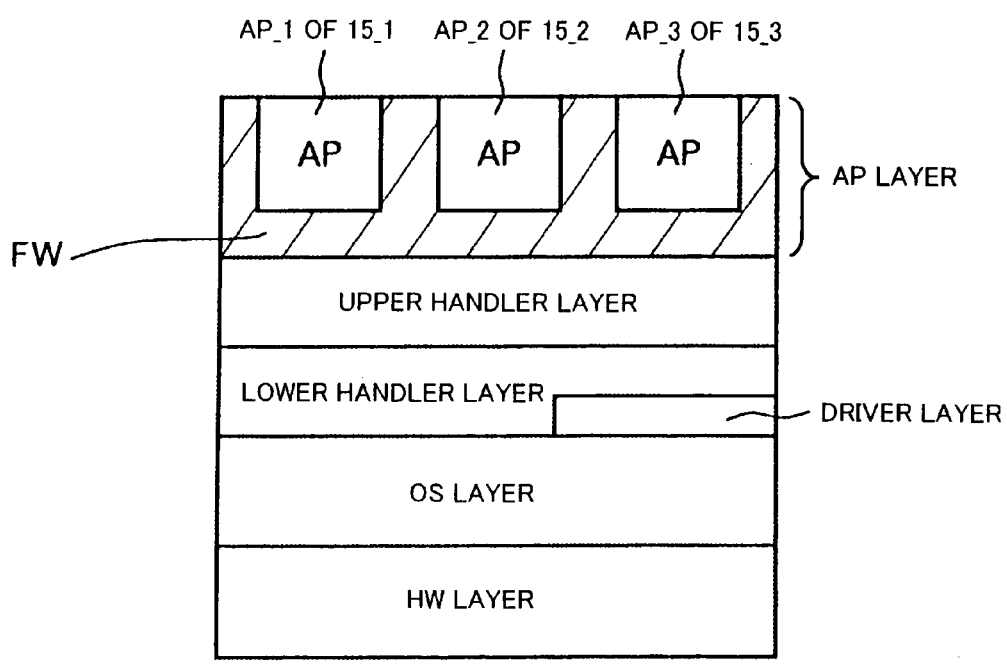
FIG. 4 is a view for explaining the software structure of a SAM module shown in FIG. 1.

The SAM module 8 has a software configuration as shown in FIG. 4.

As shown in FIG. 4, the SAM module 8 has, in order from the lower layer to upper layer, a hardware HW layer, a driver layer (OS layer) including RTOS kernels corresponding to the peripheral HW, a lower handler layer for processing in logically grouped units, a higher handler layer grouping together application specific libraries etc., and an AP layer.

Here, in the AP layer, the application programs AP_1, AP_2, and AP_3 (application programs of present invention) defining procedures for use of the IC card 3 by the credit card company or other service businesses 15_1, 15_2, and 15_3 shown in FIG. 1 are read out from the external memory 7 and operated.

Each application program can be set with one or more macro scripts.

In the AP layer, firewalls FW are provided among the application programs AP_1, AP_2, and AP_3 and with the higher handler layer.

[External Memory 7]

Figure 5:
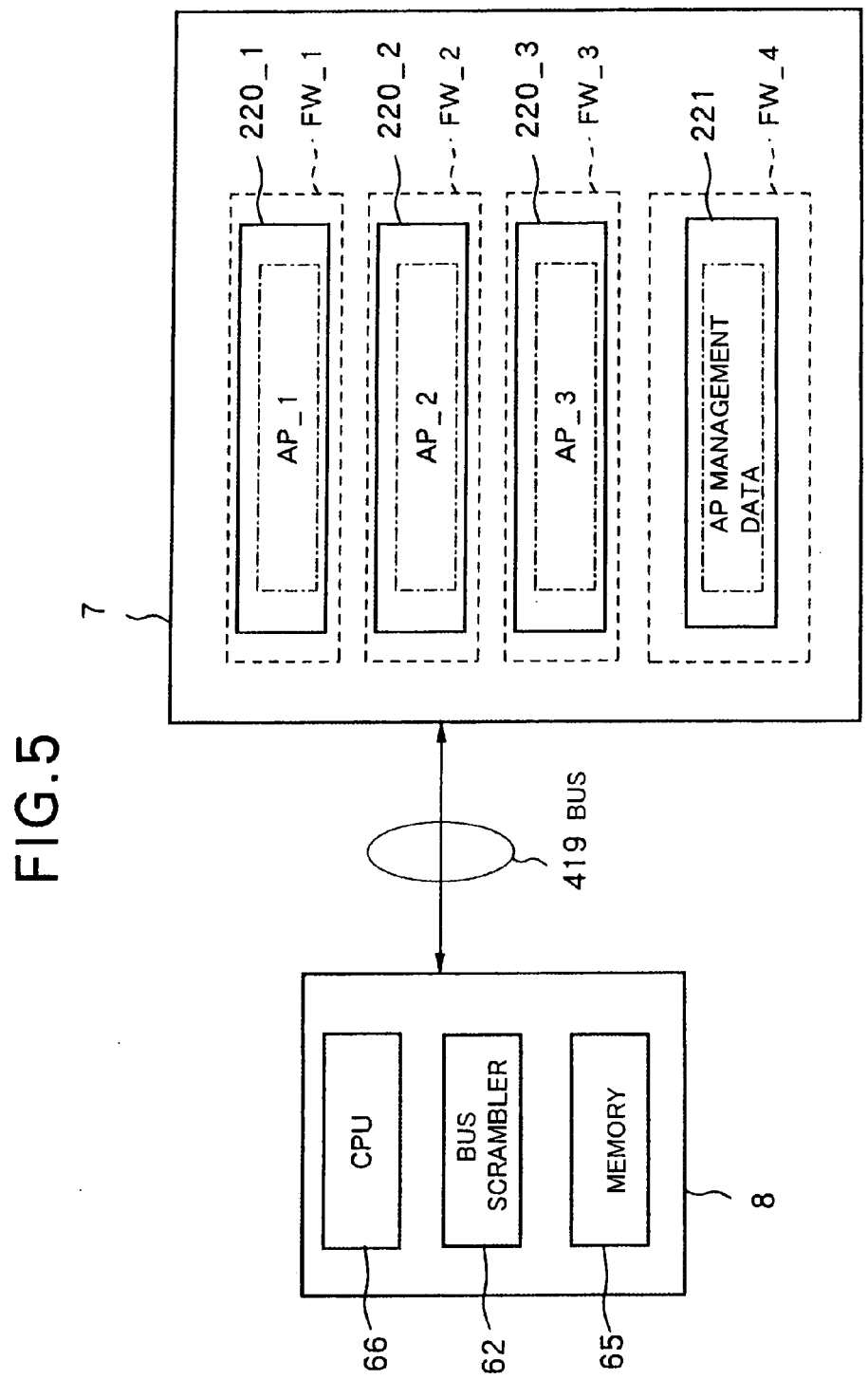
FIG. 5 is a view for explaining a memory area of an external memory shown in FIG. 1.

FIG. 5 is a view for explaining a memory area of the external memory 7.

As shown in FIG. 5, the memory area of the external memory 7 includes an AP memory area 220_1 storing the application program AP_1 of the service business 15_1, an AP memory area 220_2 storing the application program AP_2 of the service business 15_2, an AP memory area 220_3 storing the application program AP_3 of the service business 15_3, and an AP management memory area 221 used by a manager of the SAM module 208.

Here, the application programs stored in the external memory 7 in the SAM unit 9a correspond to first application programs of the present invention, and application programs stored in the external memory 7 in the SAM unit 9b corresponds to second application programs of the present invention The application program AP_1 stored in the AP memory area 220_1 is comprised of a plurality of application element data APE (data modules of present invention). Access to the AP memory area 220_1 is limited by the firewall FW_1.

The application program AP_2 stored in the AP memory area 220_2 is comprised of a plurality of application element data APE (data modules of present invention). Access to the AP memory area 220_2 is limited by the firewall FW_2.

The application program AP_3 stored in the AP memory area 220_3 is comprised of a plurality of application element data APE (data modules of present invention). Access to the AP memory area 220_3 is limited by the firewall FW_3.

In the present embodiment, the application element data APE is, for example, a minimum unit downloaded from outside of the SAM unit 9a to the external memory 7. The number of the application element data APE forming each application program can be freely determined by the corresponding service business.

The application programs AP_1, AP_2, and AP_3 stored in the external memory 7 are scrambled. They are descrambled when read into the SAM module 8.

The application programs AP_1, AP_2, and AP_3 are prepared by the service businesses 15_1, 15_2, and 15_3 using, for example, personal computers 16_1, 16_2, and 16_3 shown in FIG. 1 and are downloaded to the external memory 7 via the SAM module 8.

Below, the application programs AP_1, AP_2, and AP_3 will be described in detail.

There are one or more application programs in a SAM for each service business.

First, an application program AP stored in the external memory 7 of the SAM unit 9a (SAM_A) shown in FIG. 1 will be explained.

FIG. 6 is a view for explaining an application program AP stored in the external memory 7 of the SAM unit 9a (SAM_A) shown in FIG. 1.

As shown in FIG. 6, the application program AP has identification data AP_ID for identifying the application program AP, data APP_VER for indicating the version of the application program (or package thereof), data APE_NUM for indicating the number of the application element data APE included in the application program, identification data APE_ID of one or more application element data APE included in the application program, tag data APE_TAG, permit data PT, option data OPT, and entity APE_PL of the application element data APE.

Note that the tag data APE_TAG, the permit data PT, and the option data OPT shown in FIG. 6 and FIG. 7 correspond to first management data according to the present invention.

The identification data AP_ID is determined so that it is different for every service business.

The tag data APE_TAG is an identification tag of the application element data APE which a service business can set and is determined so that it can be unambiguously specified among the application programs AP.

In FIG. 6, the entities of the application element data APE corresponding to the three APE_ID shown by hatching among the four identification data APE_ID stored in the application program AP are transferred, as described later, from the SAM unit 9b (SAM_B) to the SAM unit 9a (SAM_A) shown in FIG. 1.

That is, the entities of these three application element data APE do not exist in the external memory 7 of the SAM unit 9a.

FIG. 7A is a view for explaining the permit data PT shown in FIG. 6.

As shown in FIG. 7A, the permit data PT has the number of mutual authentication keys, presence of mutual authentication, instance of the mutual authentication key of the SAM_A, application element data APE of the mutual authentication key of the SAM_A, instance of the mutual authentication key of the SAM_B, application element data APE of the mutual authentication key of the SAM_B, and access right data PMSD.

Here, the presence of mutual authentication, the instance of mutual authentication of the SAM_B, and the application element data APE of the mutual authentication key of the SAM_B shown by hatching in FIG. 7A are present in the SAM unit 9b and are obtained by transfer from the SAM unit 9b.

FIG. 7B is a view for explaining the option data OPT shown in FIG. 6.

As shown in FIG. 7B, the option data OPT stores the SAM_ID of the SAM_B, identification data AP_ID(B) of the application program stored in the SAM_B, and flag data PCF.

The flag data PCF has a first flag for indicating whether the application element data APE exist inside or outside of the SAM unit 9a, a second flag for indicating whether the application element data APE of the application program are to be disclosed to the public or not, and a third flag for indicating whether they are to be used temporarily or stored (used permanently) when disclosed to the outside.

In the example shown in FIG. 7B, the first flag indicates "outside", and the second and third flags are not set yet.

The permit data PT or the option data OPT, for example, store data for authenticating the legitimacy of the party able to set setting data in the application program AP. Based on the data, the SAM module 8a judges whether or not to permit the setting of the setting data.

Further, in the present embodiment, ports for use by the application programs are defined. The right for use of the ports defined by the application programs, applications, etc. are defined as management data. Based on the management data, the SAM units 9a, 9b determine the modes of use of the ports defined for the application programs.

Next, the application programs AP stored in the external memory 7 of the SAM unit 9b (SAM_B) shown in FIG. 1 will be described.

Figure 8:
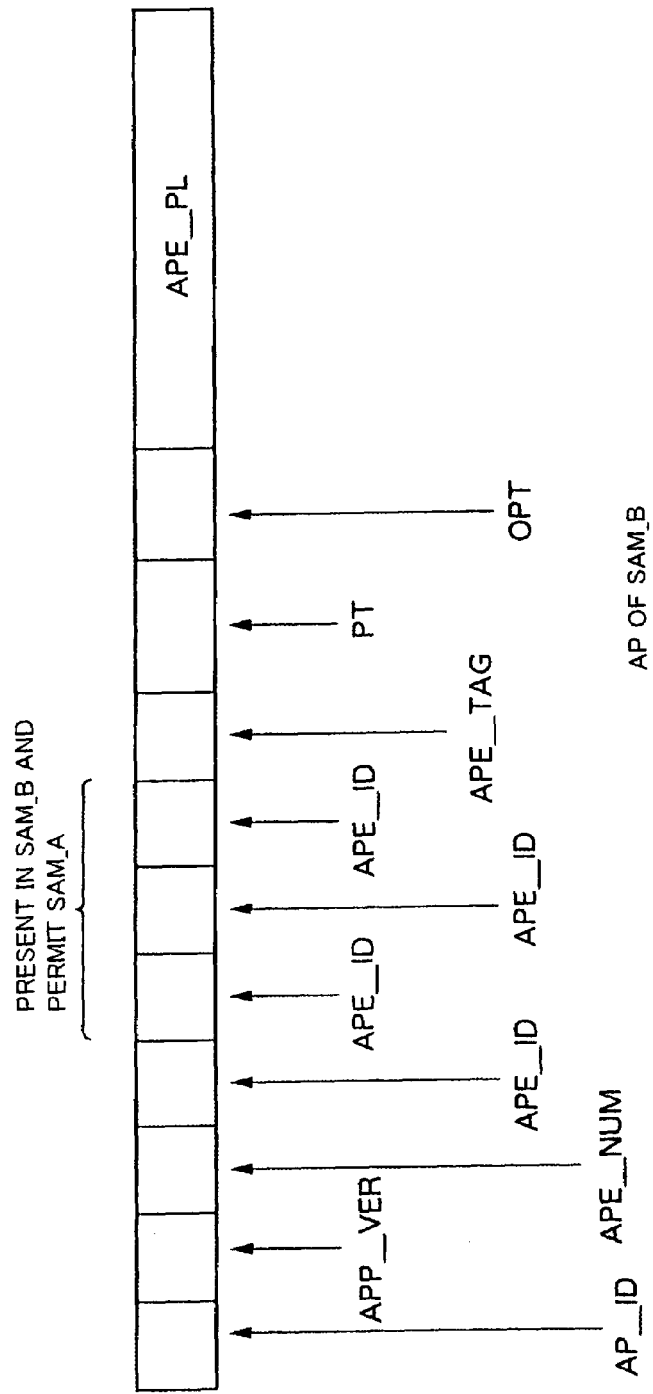
FIG. 8 is a view for explaining an application program in a discloser shown in FIG. 5.

FIG. 8 is a view for explaining an application program AP stored in the external memory 7 of the SAM unit 9b (SAM_B) shown in FIG. 1.

As shown in FIG. 8, the application program AP has identification data AP_ID for identifying the application program AP, data APP_VER for indicating the version of the application program (or package thereof), data APE_NUM for indicating the number of the application element data APE included in the application program, identification data APE_ID of one or more application elements data APE forming the application program, tag data APE_TAG, permit data PT, option data OPT, and the entity APE_PL of the application element data APE.

Note that the tag data APE_TAG, the permit data PT, and the option data OPT shown in FIG. 8 and FIG. 9 correspond to second management data according to the present invention.

Moreover, in FIG. 8, the entities of the application element data APE corresponding to the three APE_ID shown by brackets among the four identification data APE_ID stored in the application program AP are utilized from the SAM unit 9a (SAM_A) shown in FIG. 1.

These three entities of the application element data APE exist in the external memory 7 of the SAM unit 9b.

FIG. 9A is a view for explaining the permit data PT shown in FIG. 6.

As shown in FIG. 9A, the permit data PT has the number of mutual authentication keys, presence of mutual authentication, instance of the mutual authentication key of the SAM_B, application element data APE of the mutual authentication key of the SAM_B, instance of the mutual authentication key of the SAM_A, application element data APE of the mutual authentication key of the SAM_A, and the access right data PMSD.

Here, the presence of mutual authentication, the instance of the mutual authentication key of the SAM_A, and the application element data APE of the mutual authentication key of the SAM_A shown by hatching in FIG. 9A are obtained by transfer from the SAM unit 9a.

The access right data PMSD designates the mode (read, write, or execute) for permitting access (use) from outside of the application element data APE for the each APE stored in the application program AP. The designation may be performed by specifying a predetermined right.

FIG. 9B is a view for explaining the option data OPT shown in FIG. 8.

As shown in FIG. 9B, the option data OPT stores the SAM_ID of the SAM_A, identification data AP_ID(A) of an application program stored in the SAM_A, and flag data PCF.

In the flag data PCF, in the example of FIG. 9B, the first flag indicates "inside", the second flag indicates "open", and the third flag indicates "temporary use".

Note that the application element data APE are stored in the external memory 7 by setting encrypted packages by area.

Below, the types (APE_TYPE) of the application element data APE will be described.

FIG. 10 is a view for explaining the types of the application element data APE.

As shown in FIG. 10, as the types (APE_TYPE) of the application element data APE, the AP resource key data K_APR, card access key data (IC area key data, IC degenerate key data, etc.), file system configuration data, SAM mutual authentication key data, SAM key package key data, IC card operation macro command script program, memory partition key package, memory partition base key package, expansion issuance key package, issuance key package, area registration key package, area deletion key package, service registration key data, and service deletion key package are stored as application element data APE.

Below, part of the types of the application element data APE shown in FIG. 10 will be described in detail.

AP Resource Key Data K_APR

The AP resource key data K_APR is used as an encryption key for when setting the application element data APE. Different key data K_APR is allocated for every AP area to set the application element data APE.

Card Access Key Data

The card access key data is key data used for a read/write operation of data with respect to the memory 50 in the IC card 3 and the IC module 42.

The card access key data includes, for example, IC card system key data, IC card area key data, IC card service key data, IC card degenerate key data, etc.

Here, the IC card degenerate key data is key data generated by encrypting using the IC card system key data and memory area management key data of the memory 50 and is used for mutual authentication.

Further, even the key data referred to by an IC card operation macro command script program is included in application element data APE of the same type as the card access key data.

File System Configuration Data

As file system configuration data, there are, for example, log data, negative data, and journal data.

The log data is, for example, data of the history of use of the application element data APE, the negative data is, for example, information on the invalidity of an IC card, and the journal data is, for example, the history of execution at a SAM.

For example, in file system configuration, the type of the file access (record key designation, sort, ring) is selected. In case of the record key, the record size, the total number of records, record signature version, record signature method type, record data size, and record signature key are set. Further, whether to validate the signature when writing data to the file system from the outside is designated. Here, the "record" is the minimum unit for writing/reading with respect to file data.

SAM Mutual Authentication Key Data

This is also used for mutual authentication among APs in the same SAM.

The SAM mutual authentication key data is key data used in accessing corresponding application element data APE from another AP in the same SAM or from another SAM.

SAM Key Package Data

The SAM key package data is encryption key data used when exchanging card access key data and other data after mutual authentication among SAMs.

IC Card Operation Macro Command Script Program

The IC card operation macro command script program is generated by a service business itself and describes the order of processing relating to the IC card 3 and transfer with the ASP server apparatus 19. The IC card operation macro command script program is set in the SAM unit 9a, then analyzed in the SAM module 8 to generate the corresponding IC card entity data.

Key Memory Partition Package

The key memory partition package is data used to partition the memory area of the memory of the external memory 7 or IC card 3 before a service business starts to provide a service using the IC card 3.

Area Registration Key Package

The area registration key package is data used to register an area in the memory area of the memory of the IC card 3 before a service business starts to provide a service using the IC card 3.

Area Deletion Key Package (Internal Generation)

The area deletion key package is a package able to be automatically generated in a SAM from card access key data.

Service Registration Key Package (Internal Generation)

The service registration key package is data used to register the application element data APE of the external memory 7 before a service business starts to provide a service using the IC card 3.

The service registration key package is a package able to be automatically generated in a SAM from card access key data.

Service Deletion Key Package (Internal Generation)

The service deletion key package is used to delete application element data APE registered in the external memory 7.

The service deletion key package is a package able to be automatically generated in a SAM from card access key data.

The AP management memory area 221 of the external memory 7 shown in FIG. 5 stores AP management data for managing the above mentioned application programs AP_1 to AP_3.

Access to the AP management memory area 221 is limited by a firewall FW_4.

[SAM module 8]

The SAM module 8 is connected to ASP server apparatuses 19a, 19b through an SCSI or Ethernet. The ASP server apparatus 19 is connected through the Internet 10 to a personal computer 5 of an end user and to a plurality of terminal apparatuses including the personal computers 16_1, 16_2, and 16_3 of the service businesses 15_1, 15_2, and 15_3.

The personal computer 5 is connected, for example, to a dumb type card reader/writer 4 through a serial interface or USB interface. The card reader/writer 4 realizes, for example, wireless communication corresponding to a physical level with the IC card 3 (IC module 42).

Operation commands to the IC card 3 (IC module 42) and response packets from the IC card 3 (IC module 42) are generated and decrypted at the SAM unit 9a, 9b side. Therefore, the card reader/writer 4, the personal computer 5, and the ASP server apparatus 19 interposed inbetween only function to store and relay the content of the commands and response in a data payload portion and are not involved in actual operations in the IC card 3 such as data encryption and decryption, authentication, etc.

The personal computers 16_1, 16_2, and 16_3 can customize the application programs AP_1, AP_2, and AP_3 by downloading a later described script program to the SAM module 8.

FIG. 11 is a functional block diagram of a SAM module 8 shown in FIG. 1.

As shown in FIG. 11, the SAM module 8 has an ASPS communication interface 60, an external memory communication interface 61, a bus scrambler 62, a random number generator 63, an encryptor/decryptor 64, a memory 65, and a CPU 66.

The SAM module 8 is a tamper-proof module.

The ASPS communication interface 60 corresponds to the interface of the present invention, the memory 65 corresponds to a memory means of the present invention, and the CPU 66 corresponds to a processing means of the present invention.

The ASPS communication interface 60 is an interface used for data input/output with the ASP server apparatuses 19a, 19b shown in FIG. 1.

The external memory communication interface 61 is an interface used for data input/output with the external memory 7.

The bus scrambler 62 scrambles data for output and descrambles the input data when inputting and outputting data via the external memory communication interface 61.

The random number generator 63 generates random numbers used for authentication.

The encryptor/decryptor 64 encrypts data and decrypts the encrypted data.

The memory 65 stores tasks, programs, and data used by the CPU 66 as described later.

The CPU 66 executes an IC card procedure management task (job management data management task) or other task.

The CPU 66 performs processing defined in the SAM units 9a, 9b based on operation commands in the SAM units 9a, 9b and controls processing of the IC module 3a and the IC module 42 based operation commands of the IC module 3a in the IC card 3 and the IC module 42 of the mobile communication device 41.

The CPU 66 in the SAM unit 9a and the CPU 66 in the SAM unit 9b control data transfer (communication) between the SAM units 9a and 9b.

[Communication Between SAMs]

Figure 12:
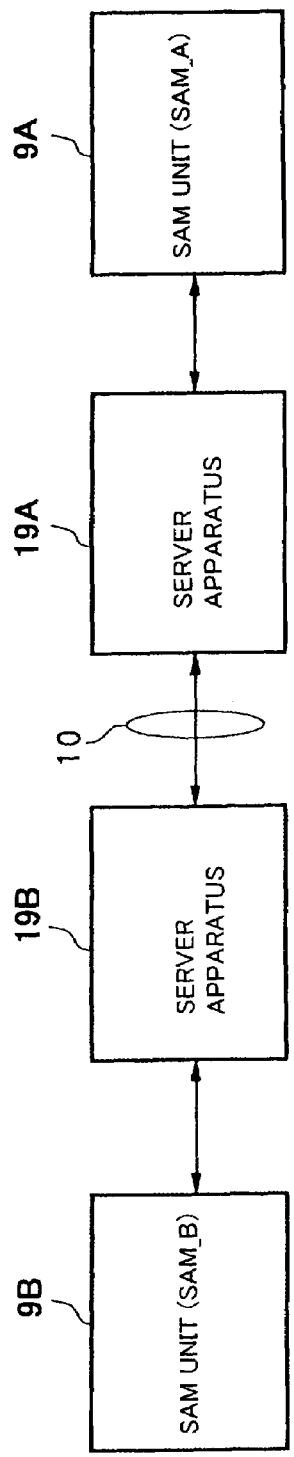
FIG. 12 is a view for explaining a communications method between SAM units shown in FIG. 1.

Below, as shown in FIG. 12, a communications method when transferring application element data APE between the SAM units 9a, 9b will be described.

In the communications system 1, as described before, when the SAM unit 9a and SAM unit 9b link to provide services using the IC card 3 and the IC module 42, the SAM units 9a and 9b transfer the application element data APE between them.

In this case, the SAM unit 9a, the server apparatus 19a, the server apparatus 19b, and the SAM unit 9b communicate using the ASPS communication interface 60 shown in FIG. 11 of the SAM units 9a, 9b.

Figure 13:
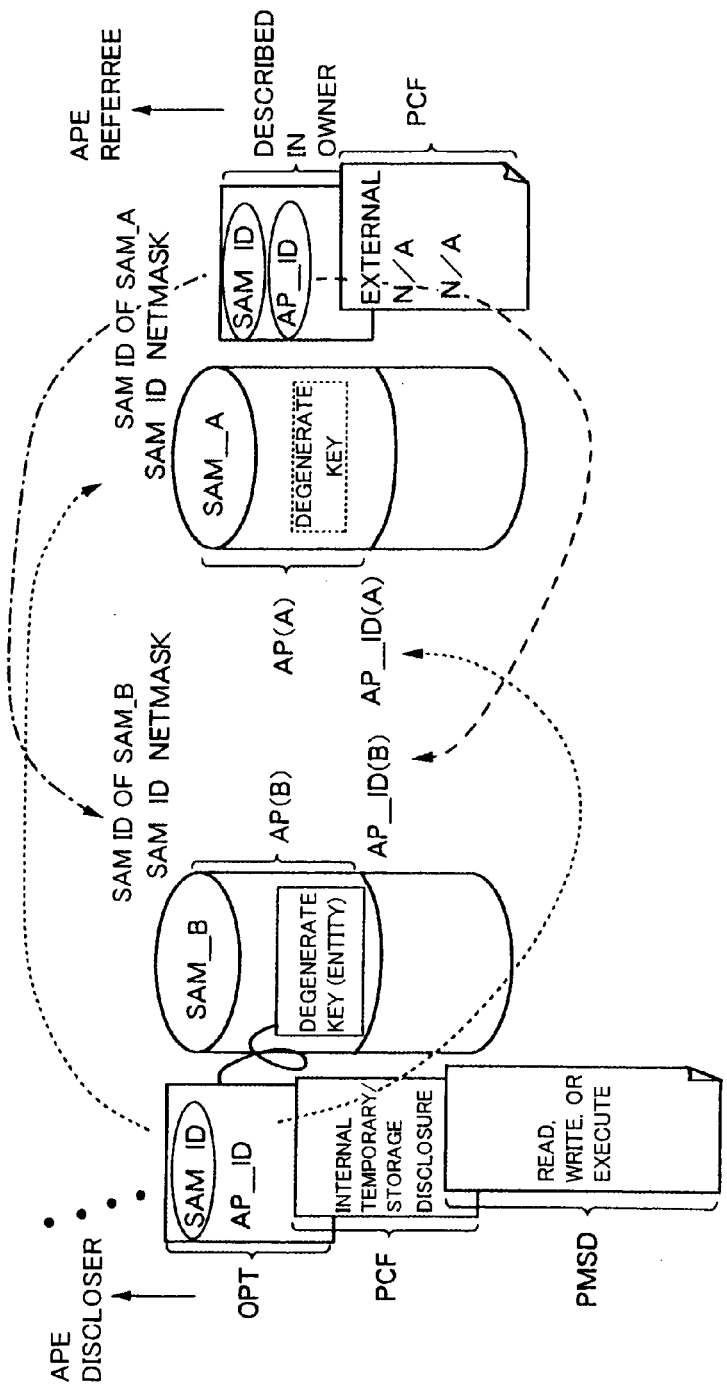
FIG. 13 is a view for explaining a case in which a degenerate key is transferred between SAM units shown in FIG. 12.

For example, as shown in FIG. 13, an entity of degenerate key data (APE) is stored in the application program AP(B) stored in the external memory 7 of the SAM unit 9b. When the degenerate key data is referred to from the application program AP(A) stored in the external memory 7 of the SAM unit 9a, the SAM unit 9b becomes a discloser and the SAM unit 9a becomes a referrer.

Further, the application element data APE of the degenerate key data is transferred from the SAM unit 9b to the SAM unit 9a.

The transfer transmits a SAM element transfer command from the SAM unit 9a to 9b based on the set content of option data OPT, flag data PCF, and access right data PMSD in the application programs AP(A), (B) of the SAM units 9a and 9b and transmits a SAM element transfer response from the SAM unit 9b to 9a in response.

Figure 14:
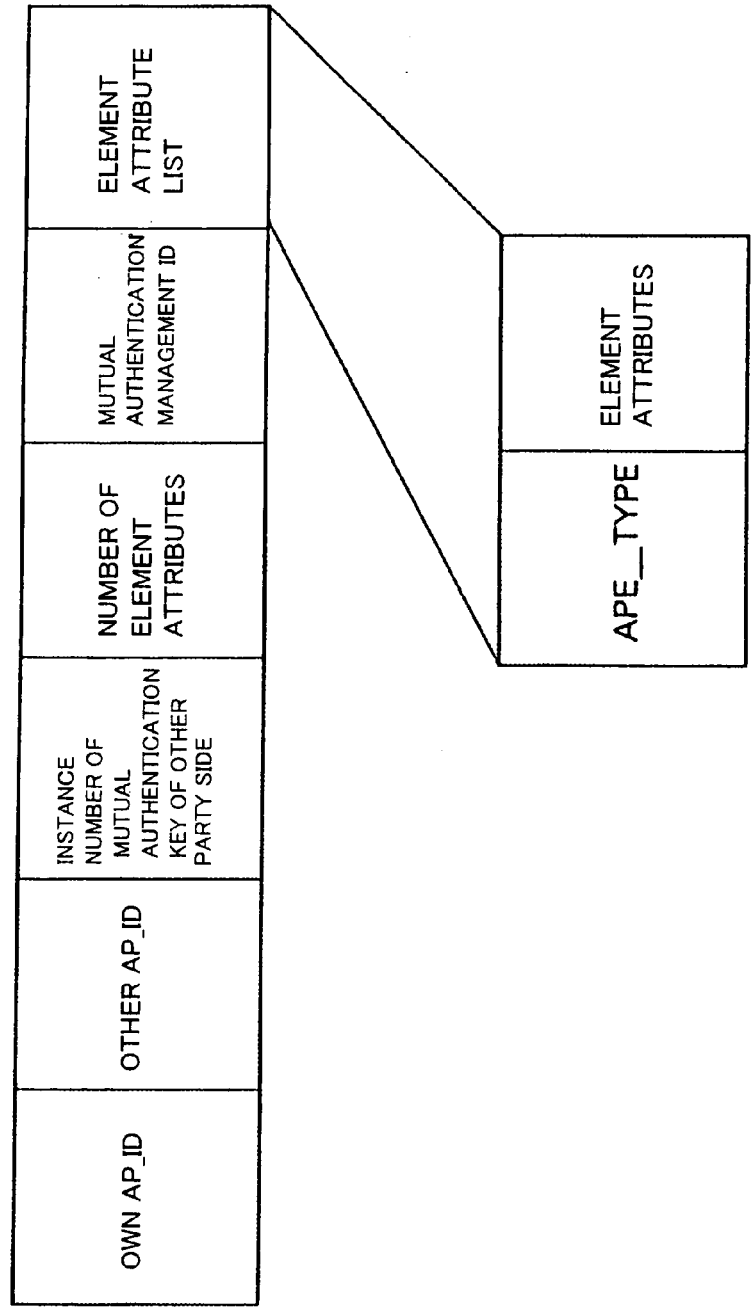
FIG. 14 is a view for explaining a SAM element transfer command SAMAPETC.

FIG. 14 is a view for explaining a SAM element transfer command SAMAPETC.

As shown in FIG. 14, the SAM element transfer command SAMAPETC has identification data AP_ID of its own (transferer of command) application program, identification data AP_ID of the other party's (transferee of command) application program, instance number of a mutual authentication key of the transferee of a command, number of the application element data APE for which transfer is requested (number of element attributes), management ID for mutual authentication with the transferee (mutual authentication ID), and an attribute list of the application element APE (element attribute list).

Here, the element attribute list has the types of the application element data APE and element attributes.

As shown in FIG. 15, the element attributes differ in the items set according to the type of the application element data APE (APE_TYEP) for which transfer is requested.

For example, as shown in FIG. 15, when the application element data APE to be transferred is area service key data, a system code, an area/service code, and an element version are set as element attributes.

Figure 16:
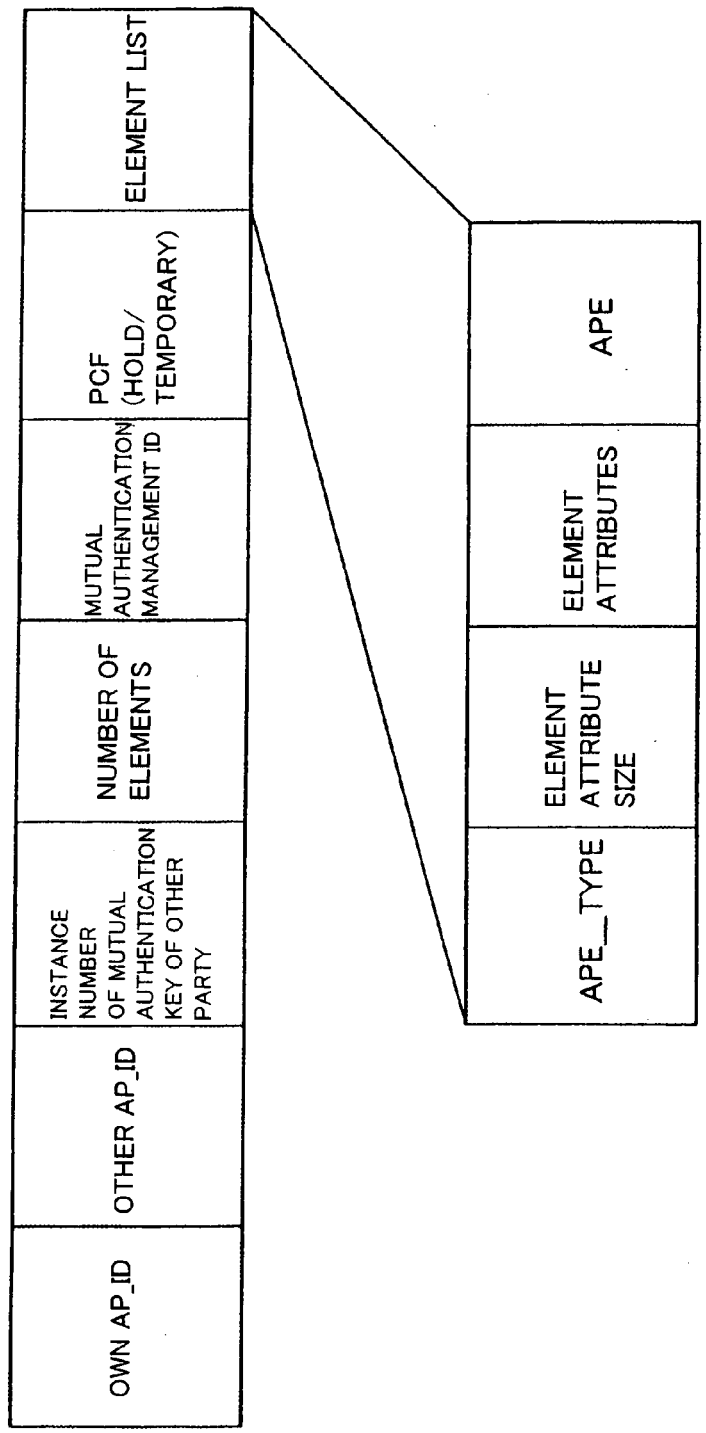
FIG. 16 is a view for explaining a SAM element transfer response SAMAPETR.

FIG. 16 is a view for explaining a SAM element transfer response SAMAPETR.

As shown in FIG. 16, the SAM element transfer response SAMAPETR comprises identification data AP_ID of its own (transferer of response) application program, identification data AP_ID of another party's (transferee of response) application program, instance number of a mutual authentication key of the transferee other party), the number of the application element data APE to be transferred (number of element attributes), management ID of mutual authentication with the transferee of a response (mutual authentication management ID), flag data PCF, and element list.

Here, the element list has the type of the application element data APE (APE_TYPE), element attribute size, element attributes, and entity of the application element data APE.

As shown in FIG. 15, the element attributes differ in items set according to the type of the application element data APE (APE_TYEP) to be returned.

For example, as shown in FIG. 15, when the application element data APE to be returned is area/service key data, area key data and service key data are set as element attributes.

Transfer between the SAM units 9a and 9b using the above SAM element transfer command/response is performed after mutual authentication between the SAM units 9a and 9b.

Figure 17:
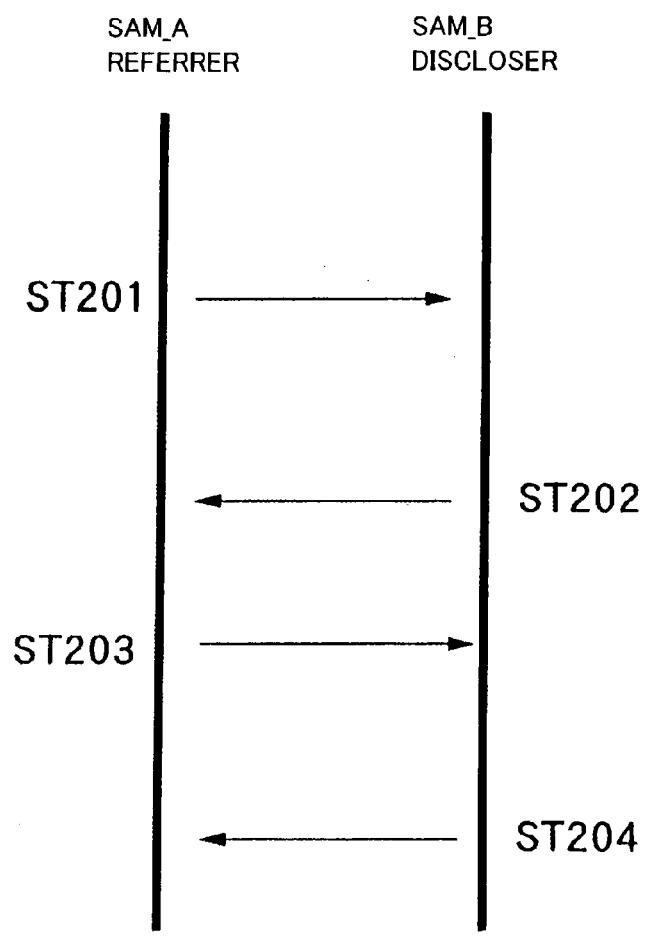
FIG. 17 is a view for explaining a routine for mutual authentication among SAMs.

FIG. 17 is a view for explaining the routine of mutual authentication between the SAM units 9a and 9b.

Step ST201:

The CPU 66 of the SAM module 8 in the SAM unit 9a of the referrer generates an authentication command AUTH_C1 storing a SAM_ID of the SAM unit 9b, AP_ID of an application program to be referred to, port ID of the AP to be used, APE_ID of the application element data APE of the mutual authentication key of the SAM unit 9a, encryption method, and random number RA generated by the SAM unit 9a encrypting using mutual authentication key data AK_B of the SAM unit 9b. The CPU 66 sends the authentication command AUTH_C1 to the SAM unit 9b via the server apparatuses 19a, 19b.

Step ST202:

The CPU 66 of the SAM module 8 in the SAM unit 9b of the side providing the APE decrypts the authentication command AUTH_C1 received at step ST201 using the mutual authentication key data AK_B to generate an authentication response AUTH_R1 storing the data obtained by said decryption and a random number RB generated by the SAM unit 9b encrypted using the mutual authentication key data AK_A of the SAM unit 9a. The CPU 66 sends the authentication response AUTH_R1 to the SAM unit 9a via the server apparatuses 19b, 19a.

Step ST203:

The CPU 66 of the SAM module 8 in the SAM unit 9a decrypts the authentication response AUTH_R1 received at step ST202 using the mutual authentication key data AK_A, judges whether a random number RA obtained by said decryption and the random number RA generated at step ST201 match, and, if judging they match, generates an authentication command AUTH_C2 storing the random number RB encrypted using the mutual authentication key data AK_B. The CPU 66 sends the authentication command AUTH_C2 to the SAM unit 9b via the server apparatuses 19a, 19b.

Step ST204:

The CPU 66 of the SAM module 8 in the SAM unit 9b decrypts the authentication command AUTH_C2 received at step ST203 using the mutual authentication key data AK_B, judges whether a random number RB obtained by said decryption and the random number RB generated at step ST202 match, and, when judging that they match, stores a mutual authentication management ID and generates an authentication response AUTH_R2. The CPU 66 sends the authentication response AUTH_R2 to the SAM unit 9a via the server apparatuses 19a, 19b.

Due to this, mutual authentication between the SAM units 9a and 9b is completed.

Note that when the SAM units 9a and 9b have already finished the mutual authentication and the session is established, after the transmission of the authentication command AUTH_C1 at step ST201, step ST202 and step ST203 may be omitted and the authentication response AUTH_R2 sent at step ST204.

That is, if the SAM units 9a, 9b manage mutual authentication in units of mutual authentication key data and a session is established, the mutual authentication procedures can be omitted. Here, the judgment about whether a session is already established for a requested processing using corresponding mutual authentication key data is performed at a requestee (SAM unit 9b in FIG. 17).

Below, an example of operation for transfer of degenerate key data between the SAM units 9a and 9b will be explained using FIG. 18.

Figure 18:
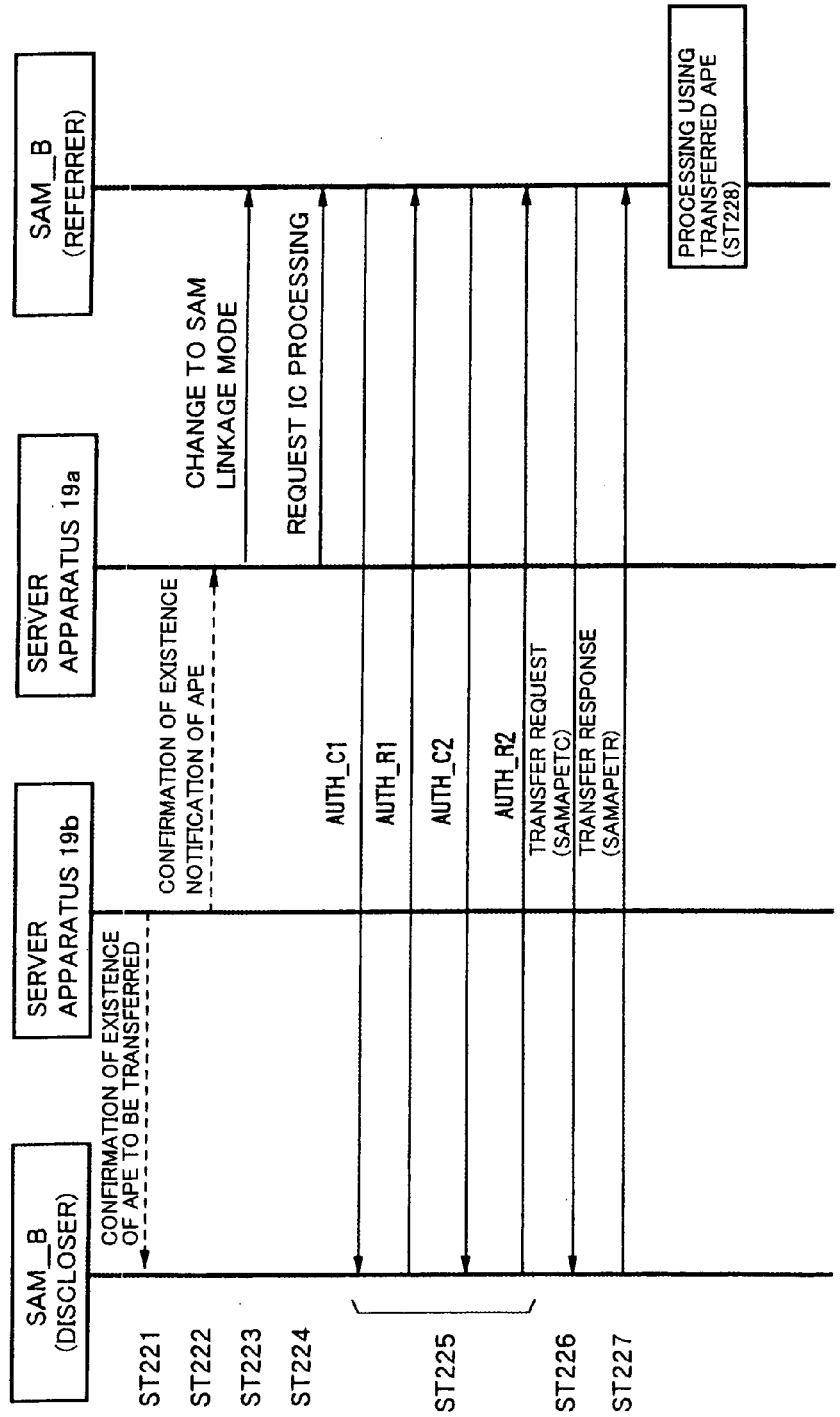
FIG. 18 is a view for explaining an example of operation for transfer of degenerate key data between SAM units explained before using FIG. 13.

FIG. 18 is a view for explaining an example of this operation.

Step ST221:

The server apparatus 19b confirms whether degenerate key data is already set (updated) in the SAM unit 9b.

Step ST222:

The server apparatus 19b notifies the server apparatus 19a that the degenerate key data is already set in the SAM unit 9b. That is, it notifies a referrer that application element data APE to be transferred is already prepared in the SAM unit 9b.

Step ST223:

The server apparatus 19a changes an internal state (mode) of the CPU 66 of the SAM unit 9a to a mode enabling linkage among SAMs.

Step ST224:

The server apparatus 19a requests processing using the IC card 3 (IC module 42) to the SAM unit 9a.

Step ST225:

The CPU 66 in the SAM unit 9a performs processing based on said request. During the processing, if degenerate key data of the application element data APE present in the SAM unit 9b is required and, further, the degenerate key is not present in the SAM unit 9a, the CPU 66 performs mutual authentication described using FIG. 17 with the SAM unit 9b to establish a session.

Step ST226:

The CPU 66 in the SAM unit 9a sends the SAM unit 9a a request for a transfer of the degenerate key data (SAMAPETC shown in FIG. 18).

Step ST227:

The CPU 66 in the SAM unit 9b generates a SAM element transfer response (SAMAPETR) shown in FIG. 16 storing application element data APE of the designated degenerate key data in accordance with the transfer request and sends the same to the SAM unit 9a.

Step ST228:

The CPU 66 in the SAM unit 9a terminates the session established at step ST225 and performs processing concerning the IC card 3 (IC module 42) using the degenerate key data stored in the received SAM element transfer response.

Next, an example of realization of operations to generate and partition a memory partition key package shown in FIG. 10 by communication between the SAM units 9a and 9b.

In this example, for instance, a memory manager lending out the memory areas of memories in the IC card 3 and the IC module 42 and performing other operations uses the SAM unit 9b, while a memory area provider uses the SAM unit 9a.

Here, the memory partition package is generated based on a memory partition base package.

The memory partition base package is generated by the SAM unit 9a at the manager side, while the memory partition package is generated at the SAM unit 9b at the memory area provider side.

Therefore, when the SAM unit 9b generates a memory partition package, it is necessary to obtain a memory partition base package from the SAM unit 9a.

Figure 19:
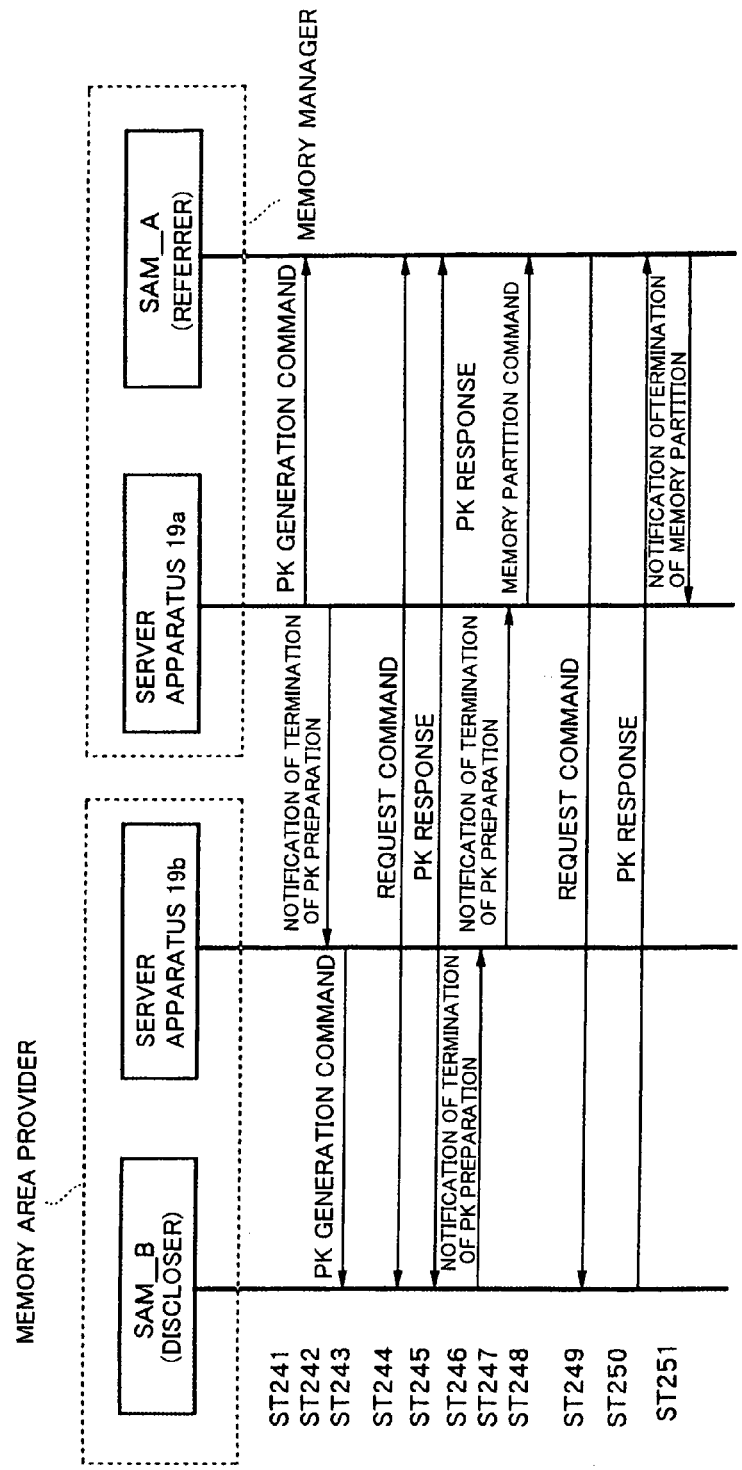
FIG. 19 is a view for explaining processing for generation and transfer of a memory partition package.

FIG. 19 is a view for explaining processing for generation and transfer of a memory partition package.

Step ST241:

The server apparatus 19a of the memory manager sends a command for generation of a memory partition base package to the SAM unit 9a.

In response to said command, the SAM unit 9a generates the memory partition base package.

Step ST242:

The server apparatus 19a notifies the server apparatus 19b that the memory partition package has been generated in the SAM unit 9a.

Step ST243:

The server apparatus 19b issues a command for generation of a memory partition package data to the SAM unit 9b.

Step ST244:

After the SAM units 9a and 9b perform mutual authentication described using FIG. 17, the SAM unit 9b sends the SAM unit 9a a SAM element transfer command of the format shown in FIG. 14 designating memory partition base packet data.

Step ST245:

In accordance with the SAM element transfer command, the SAM unit 9a sends the SAM unit 9b the SAM element transfer response shown in FIG. 16 storing the memory partition base package generated at step ST241.

The SAM unit 9b generates a memory partition package using the received memory partition base package.

Step ST246:

The SAM unit 9b notifies the server apparatus 19b that the memory partition package has been generated.

Step ST247:

The server apparatus 19b notifies the server apparatus 19a that the memory partition package has been generated.

Step ST248:

The server apparatus 19a sends the server apparatus 19a a memory partition command for instructing partition of the memories in the IC card 3 and the IC module 42.

Step ST249:

After the SAM units 9a and 9b performing the mutual authentication described using FIG. 17, the SAM unit 9a sends the SAM unit 9b a SAM element transfer command of the format shown in FIG. 14 designating memory partition packet data.

Step ST250:

In accordance with the SAM element transfer command, the SAM unit 9b sends the SAM unit 9a the SAM element transfer response shown in FIG. 16 storing the memory partition package generated at step ST245.

Step ST251:

The SAM unit 9b uses the received memory partition package, for example accesses the IC module 42 stored in the mobile communication device 41 through the server apparatus 19b and Internet 10, partitions the memory area of the memory in the IC module 42, and has a predetermined service business use it.

Note that the SAM units 9a and 9b may communicate by simultaneously setting a plurality of communication paths transmitting application element data APE.

Below, the method of setting the tag data APE_TAG shown in FIG. 8 for the above mentioned memory partition package (APE) will be explained.

When partitioning memory areas of the memories in the IC card and the IC module 42 into many areas, a name by which use of a partitioned memory area is envisioned is set as the tag data APE_TAG.

Figure 20:
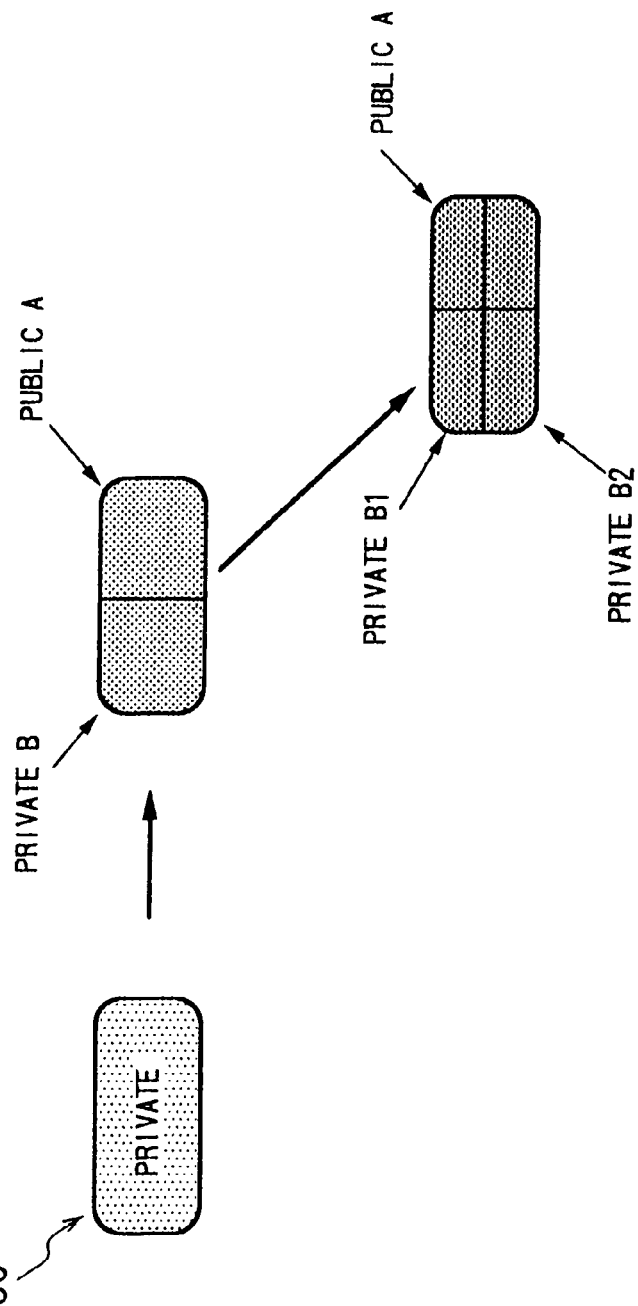
FIG. 20 is a view for explaining a method of setting tag data APE_TAG shown in FIG. 8 for a memory partition package (APE).

Specifically, as shown in FIG. 20, there is a case wherein a memory area (private) of the memory 50 of the IC module 3a in the IC card 3 or the IC module 42 is partitioned into an area for a service business B to use (Private B) and an area for another service business A to use (Public A), then the area (Private B) is used by partitioning the same into an area for a service business B1 to use (Private B1) and an area for a service business B2 to use (Private B2).

In this case, a tag name "Public" is used when an area is a public area, and tag names "Private B1", "Private B2" are used when an area is a private area.

In the case, it is possible to realize a memory partition operation designating tag data APE_TAG if the above mentioned tag data APE_TAG and content for the memory partition package are acceptable for a manager side managing the SAM units 9a, 9b.

As a naming rule of tag data APE_TAG of a memory partition package envisioning multiple partitioning, strings of characters linking the type of the issuance package, memory partition package, or other package, the memory partition area name, area code, or service code are used.

Examples of element tag commands of a package in the case shown in FIG. 20 will be listed below:

"D:¥¥PrivateB2" is used as the tag data APE_TAG of a memory partition package in the memory partition area B2, "I:¥¥PrivateB1" is used as the tag data APE_TAG of an issuance package of the memory partition area B1, and "S: ¥¥Public¥100C" is used as the tag data APE_TAG of a service "100C" in a public area.

Below, the overall operation of the communications system 1 shown in FIG. 1 will be described.

Figure 21:
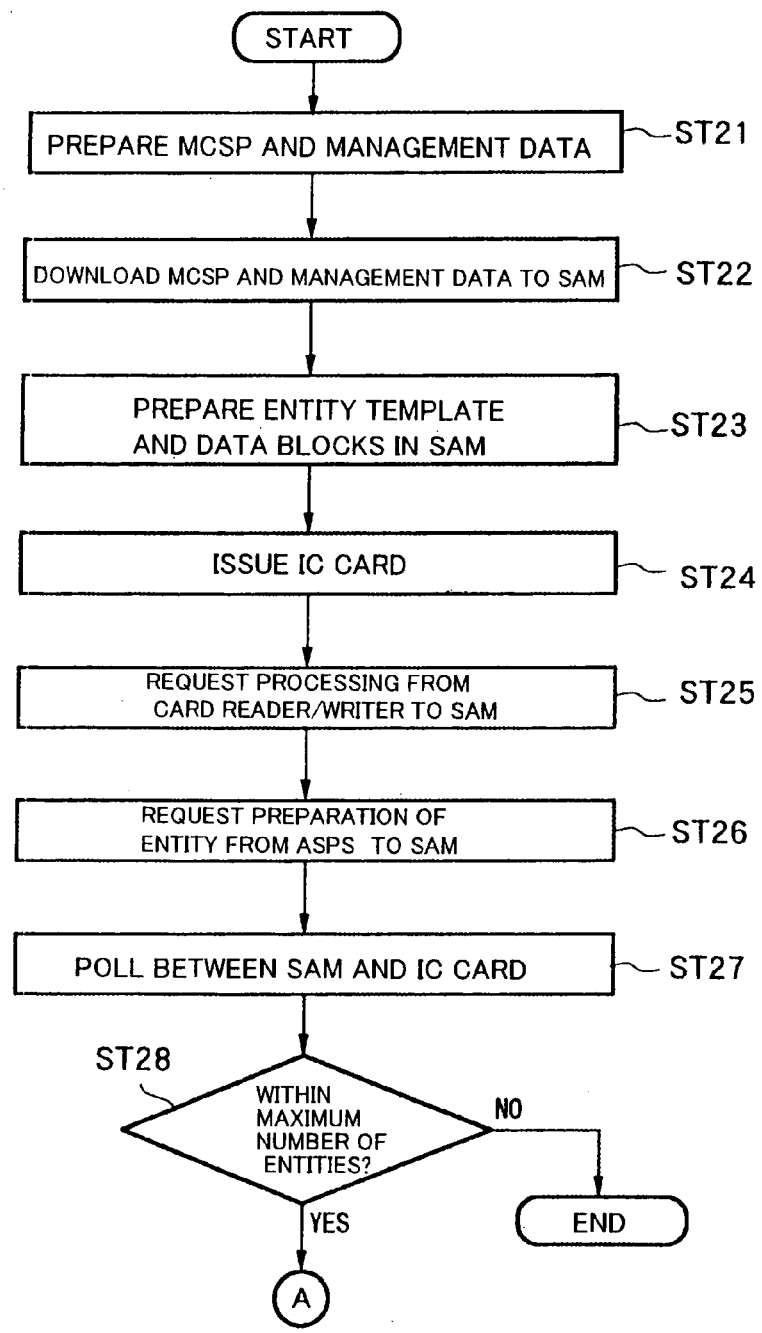
FIG. 21 is a view for explaining the overall operation in a communications system shown in FIG. 1.
Figure 22:
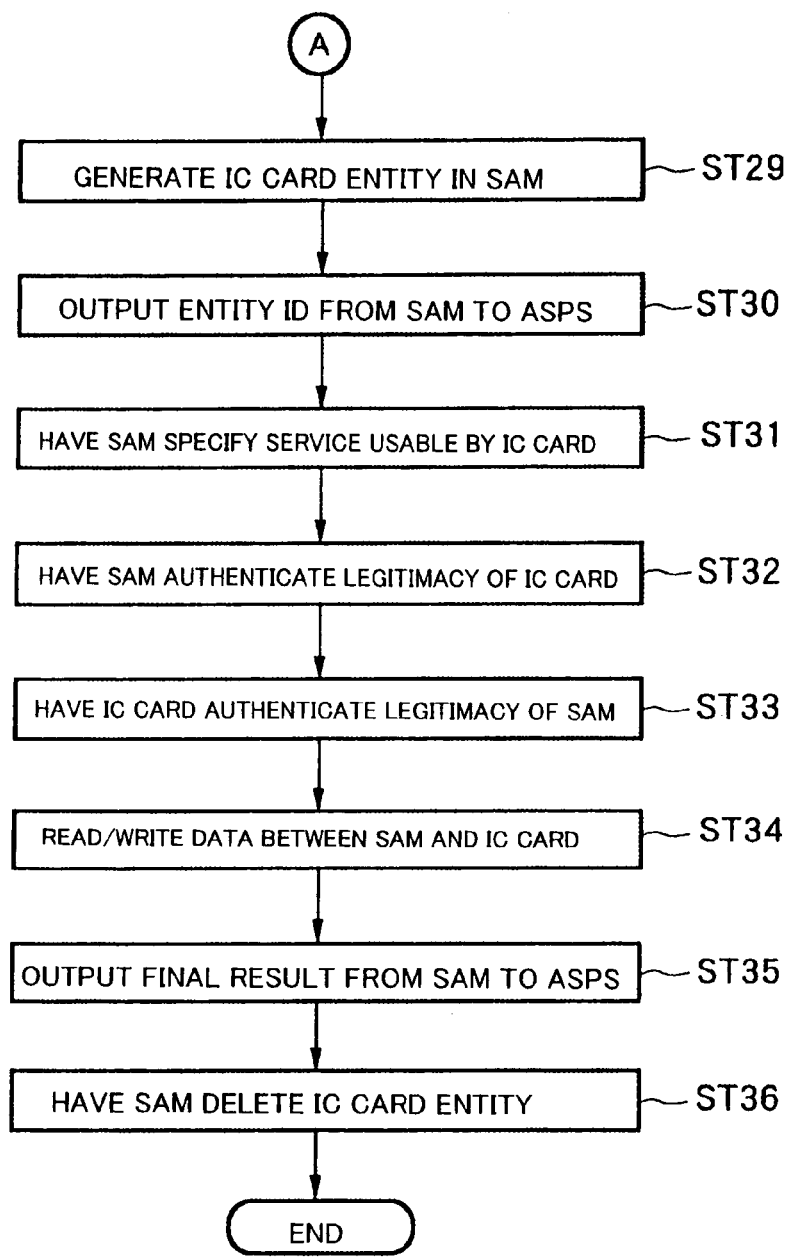
FIG. 22 is a view for explaining the overall operation in a communications system shown in FIG. 1.

FIG. 21 and FIG. 22 are views for describing the overall operation in the communications system 1 shown in FIG. 1.

Step ST21:

Service businesses 15_1 to 15_3 or parties receiving requests from the service businesses prepare script programs describing processing concerning transactions which the service businesses perform using IC cards 3 on personal computers 16_1, 16_2, and 16_3 shown in FIG. 1.

Moreover, a manager of a SAM module 8 prepares corresponding AP management data of the service businesses 15_1 to 15_3.

Step ST22:

The AP management data is stored in an external memory 7.

Then, the script program prepared at step ST21 is downloaded from the personal computers 16_1, 16_2, and 16_3 to the external memories 7 of the SAM units 9a, 9b through the Internet 10, ASP server apparatuses 19a, 19b, and the SAM module 8. The download processing of the download is, as shown in FIG. 13, managed by a script download task in the SAM module 8.

Step ST23:

A script interpretation task in the SAM module 8 uses the AP management data and the script program to generate IC card entity template data, input data blocks, output data blocks, log data blocks, and operation definition data blocks for the service businesses.

These generated data are stored in a memory 65 of the SAM module 8 shown in FIG. 11.

Step ST24:

An IC card 3 (IC module 42) is issued to a user.

Memories 50 of an IC module 3a and an IC module 42 shown in FIG. 3 store key data used for transactions with a service business with which a user contracts.

The contract between the user and the service business may be concluded through the Internet 10 etc. after the IC card 3 is issued.

Step ST25:

For example, when a user accesses a server apparatus 2 by using a personal computer 5 through the Internet 10 to try to purchase merchandise, a server apparatus 2 issues a processing request to the ASP server apparatuses 19a, 19b through the Internet 10.

When receiving a processing request from the server apparatus 2, the ASP server apparatuses 19a, 19b access the personal computer 5 through the Internet 10. Then, a processing request for the IC card 3 from the card reader/writer 4 is sent to the SAM module 8 in the SAM units 9a, 9b through the personal computer 5, Internet 10, and ASP server apparatuses 19a, 19b.

Step ST26:

An entity generation request is issued to the SAM module 8 from the ASP server apparatuses 19a, 19b. The entity generation request stores data indicating the issuer of the IC card 3.

Step ST27:

The SAM module 8 performs polling with the IC card 3 when receiving an entity generation request.

Step ST28:

An entity generation task 71 in the SAM module 8 judges, after the polling, whether the number of IC card entity data present in the SAM module 8 is smaller than a maximum number defined by an SC command of the script program. If smaller than the maximum number, the task proceeds to step ST29, otherwise the processing is ended.

Step ST29:

The entity generation task specifies the IC card entity template data of which service business to use for example based on data stored in the entity generation request and indicating the issuer of the IC card 3 and uses the specified IC card entity template data to generate IC card entity data.

Step ST30:

The SAM module 8 outputs to the ASP server apparatuses 19a, 19b the entity ID of the IC card entity data generated at step ST29.

Step ST31:

An IC card procedure management task in the SAM module 8 searches for services usable by the IC card 3.

Step ST32:

The IC card procedure management task in the SAM module 8 authenticates the legitimacy of the IC card 3.

Step ST33:

The IC card 3 authenticates the legitimacy of the SAM module 8.

By steps ST32 and ST33, mutual authentication between the IC card 3 and the SAM module 8 is performed.

At this time, as mentioned above, in accordance with the application element data APE executed in the SAM module 8, the AP management data is referred to, a card access key is obtained, then mutual authentication is performed using the obtained key between the SAM module 8 and a CPU 51 of the IC card 3.

Step ST34:

The IC card procedure management task of the SAM module 8 reads and writes data necessary for procedures with the IC card 3.

Further, the IC card procedure management task 72 uses an equation specified based on the IC card entity data to perform predetermined arithmetic processing using the data read out from the IC card 3.

Step ST35:

The IC card procedure management task in the SAM module 8 outputs the processing result of step ST34 to the ASP server apparatuses 19a, 19b.

Step ST36:

For example, the IC card procedure management task 72 of the SAM module 8 deletes the IC card entity data.

As described above, according to the communications system 1 and the SAM units 9a, 9b, it becomes possible, by communication between SAMs, to receive application element data APE such as a card access key or key issuance package in a confidential state.

Moreover, since it is possible to define, as the setting for communication between SAMs, the range of disclosure of the application element data APE to other SAMs, so it is possible for the SAM of the disclosing side to define the range of access from the application element data APE.

Further, according to the communications system 1 and the SAM units 9a, 9b, since access attributes to the application element data APE can be defined as settings for communication between SAMs, it becomes possible for a SAM at the disclosing side to individually set a write right, read right, and execution right to the application element data APE.

Further, according to the communications system 1 and the SAM units 9a, 9b, since it is possible to define the right for setting the range of disclosure and the access attributes of the application element data APE as settings for communication between SAMs, it is possible to prevent settings from being illicitly performed.

Further, according to the communications system 1 and the SAM units 9a, 9b, since the range of disclosure of the application element data APE is in units of mutual authentication key data as settings for communication between SAMs, it is possible to lighten the load for mutual authentication accompanying disclosure of application element data APE.

According to the communications system 1 and the SAM units 9a, 9b, in mutual authentication between SAMs, it is possible to partly omit the mutual authentication processing in the case of the identical mutual authentication key and mutual authentication area, so it becomes possible to reduce communication costs accompanying mutual authentication and lighten processing in the SAMs.

According to the communications system 1 and the SAM units 9a, 9b, by using tag data APE_TAG for designation of the application element data APE to be transferred in communication between the SAMs, it becomes possible for a service business and a memory manager to manage memory in various ways.

According to the communications system 1 and the SAM units 9a, 9b, in communication between SAMs, by expanding the types and contents of the application element data APE for transfer and transferring a log etc. relating to card processing, it becomes possible to notify the start, end, etc. of processing to a SAM of an opposing party.

According to the communications system 1 and the SAM unit 9a, by forming an application program AP using a plurality of application element data APE and using the AP management table data and APP table data to define the processing content of each application element data APE, it becomes possible to provide a variety of services using an IC card 3.

Further, according to the communications system 1, it is possible to use the AP management table data and APP table data to flexibly realize use of application element data APE in the same SAM and use of application element data APE between different SAMs while maintaining high security.

According to the communications system 1, when using application element data APE between different SAMs, since the SAMs mutually authenticate, it becomes possible to increase the security of an application program.

[Other Embodiments]

Figure 23:
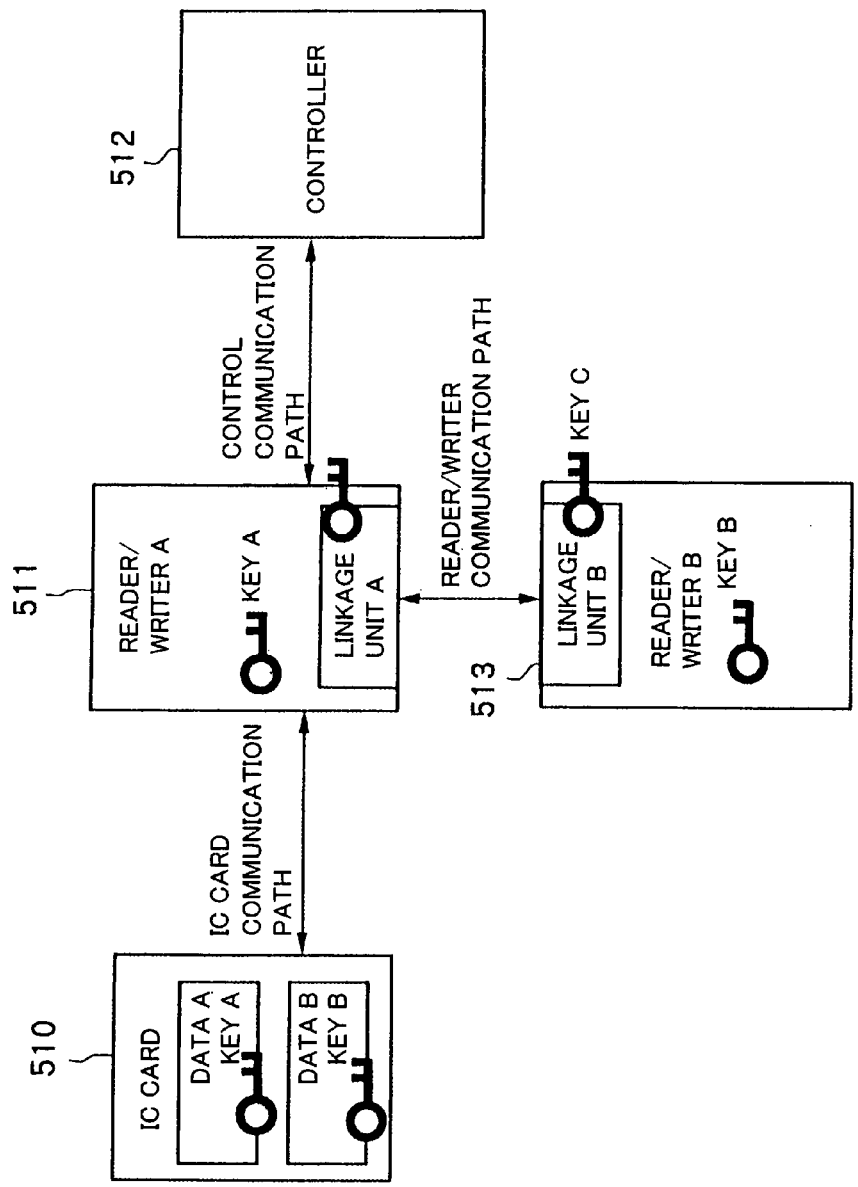
FIG. 23 is a view for explaining another embodiment of the present invention.

FIG. 23 is a view for explaining another embodiment of the present invention.

As shown in FIG. 23, in an IC card (IC module) 510, there are two data areas for data A handled by a service business A providing a predetermined service using an IC module 3a or an IC module 42 and data B handled by a service business B providing a predetermined service.

Key data A and key data B required when a reader/writer 511 accesses the IC card 510 are set for each.

The service business A has the reader/writer 511(A), and the service business B has the reader/writer 513(B).

The reader/writer 511 held by the service business A holds a key A generated by the service business A enabling access to the data A in the IC card 510. The reader/writer B held by the service business B holds a key B generated by the service business B enabling access to the data B in the IC card.

The key data is set beforehand by utilizing a controller 512. When the controller 512 issues an instruction indicating the key data setting, the reader/writer 511 holds the key data.

In FIG. 23, there is only one controller 512 connected to the reader/writer 511, however, the service business B sets the key data in the reader/writer 513 beforehand by the controller 512. Due to this, the key data A generated by the service business A is unknown to the service business B, while conversely the key data B generated by the service business B is unknown to the service business A.

The controller 512 is connected to the reader/writer 511 via a control communication path and transmits an instruction for accessing data in the IC card 510 from the controller 512 to the reader/writer 511.

The instruction includes a read operation of a designated area of a memory in the IC card 510, a write operation of designated data to a designated area, etc. In the case of a read operation, the read data is returned to the controller via the communication path. In case of a write operation, it is returned to the controller via the communication path whether the write operation was successful or not.

For example, suppose that the IC card 510 storing the data A and data B is connected to the reader/writer 511 via the communication path. Note that the IC card communication path may be a wire, wireless, optical, or any other means so long as it is above to exchange information. Here, suppose that the controller issues an instruction to the reader/writer 511, via the control communication path, for reading out the data A in the IC card 510 and writing the data A to the data B.

At this time, the reader/writer 511, as mentioned above, has to access both the data A and the data B in the IC card 510. Since the reader/writer 511 only holds the key data A enabling access to the data A, it issues a request for acquisition of data B enabling access to the data B to the linkage unit A.

The linkage unit A is connected to the linkage unit B in the reader/writer 513 via a reader/writer communication path and transmits the above acquisition request to the linkage unit B. Note that the reader/writer communication path, like the above-mentioned IC card communication path, may be a wire, wireless, optical, or any other means able to exchange information. Information flowing through the reader/writer communication path is encrypted by the key data C held by the linkage unit A and the linkage unit B, so what information is being exchanged cannot be determined. The linkage unit B in the reader/writer B receiving the acquisition request encrypts the key data B enabling access to the data B in the IC card 510 by the key data C and returns it to the linkage unit A in the reader/writer 511 via the reader/writer communication path. By the above operations, the reader/writer 511 can acquire both the key data A required for accessing the data A in the IC card 510 and the key data B required for accessing the data B in the IC card 510.

Due to this, it becomes possible to read out the data A in the IC card 510 and to write the data A into an area of the data B.

Figure 24:
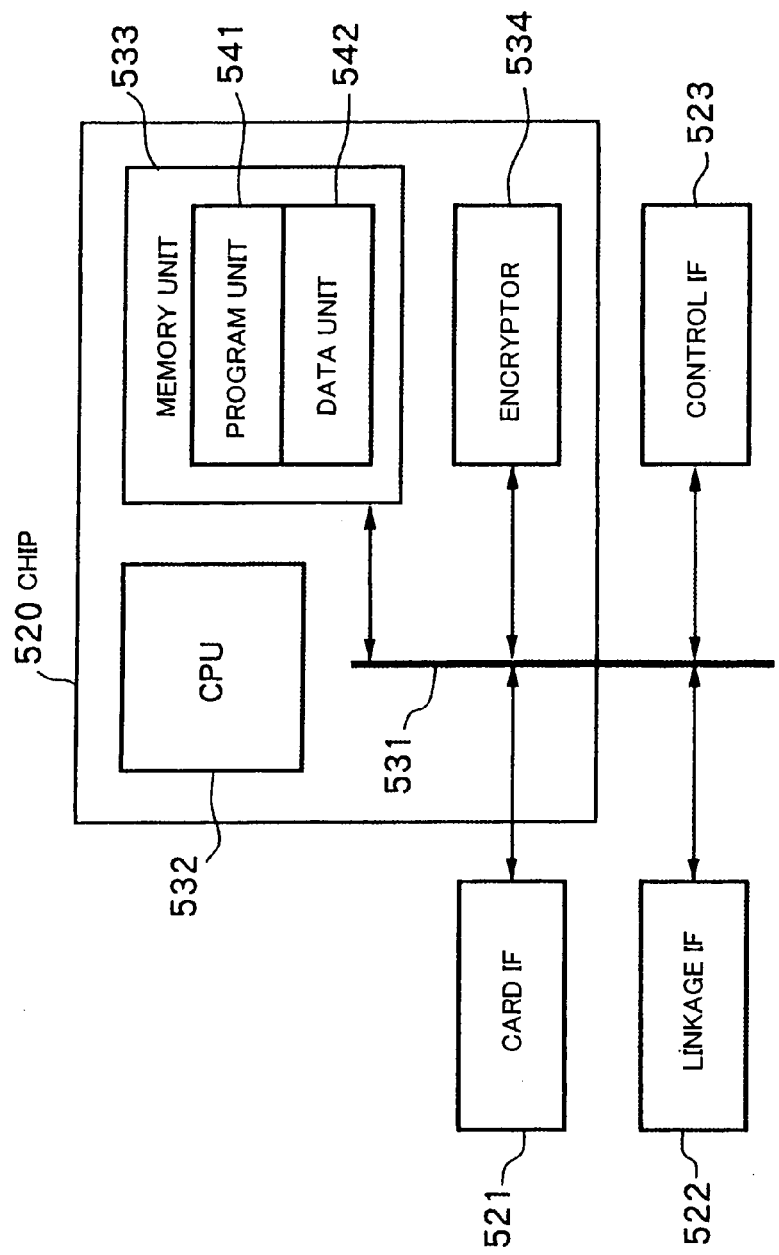
FIG. 24 is a view for explaining another embodiment of the present invention.

The reader/writers 511 and 513 hold a variety of key data information, so cannot be easily analyzed. FIG. 24 shows an example of the configuration of the reader/writers 511 and 513.

A CPU 532 is a central processing unit for overall control. A memory unit 533 is comprised of a program unit 541 in which arithmetic control routines of the CPU 532 are stored and a data unit 542 holding arithmetic control results etc. obtained by the CPU 532.

An encryptor 534 utilizes key data given from the CPU 532 to encrypt or decrypt data given from the CPU 532.

The CPU 532, the memory unit 533, and the encryptor 534 are connected via an internal bus 531. Since they handle a large amount of information requiring confidentiality, they are mounted on the same chip 520 so that operation cannot be analyzed from the outside.

A control IF 523 is an interface for communicating with the controller 512 shown in FIG. 23, whereby data given from the CPU 532 is transmitted to the controller 512 and data received from the controller 512 is fetched into the CPU 532.

A card IF 521 is an interface for communicating with the IC card 510, whereby data given from the CPU 532 is transmitted to the IC card 510 and data received by the IC card 510 is fetched into the CPU 532.

A linkage IF 522 is an interface for communicating with other reader/writers, whereby data given from the CPU 532 is transmitted to the other reader/writers and data received from the other reader/writers is fetched into the CPU 532.

The reader/writers 511 and 513 of FIG. 23 are set in advance with only the key data C, so even the service businesses owning the reader/writers cannot be learned.

On the other hand, the service business A, before use, generates key data A enabling access to the data A in the IC card 510. The CPU 532 reads the key data from the control IF 523 and holds it in a specific area in the memory unit 533 by a routine stored in the program unit 541 in the memory unit 533.

Further, there is an information management area for managing what data key in the IC card 510 data held by a reader/writer can current access in the data unit 542 in the memory unit 533.

Figure 25:
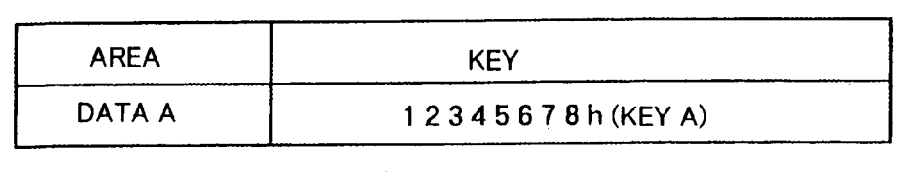

The information management area can learn the key data which it holds itself by the table shown in FIG. 25. The key data shown in FIG. 25, that is, the eight digit hexadecimal 12345678, is shown as an example.

Figure 26:
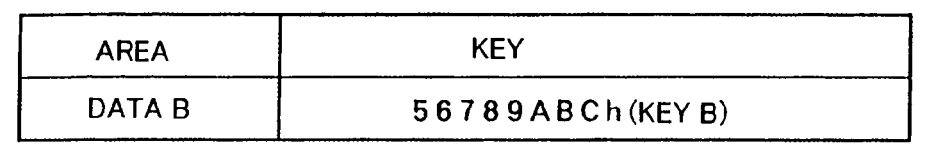

When the IC card 510 in which the data A and the data B are stored is connected via the IC card IF 521 and the controller 512 sends an instruction via the control IF 523 for writing the data B to the area of the data A, the reader/writer 511 searches through the information management area. Since the data unit 542 in the memory unit 533 only contains the key data A enabling access to the data A, it sends a request for acquisition of the key data B to the reader/writer 513 via the linkage IF 522. The information management area in the reader/writer 513 receiving the request holds the table shown in FIG. 26 and stores key data, for example, the eight-digit hexadecimal 56789ABC.

When the reader/writer 513 receiving the request searches through the information management area, it determines that it holds the key data required for accessing the data B, so returns the key data to the reader/writer 511 via the linkage IF 522. Note that the linkage IF 522 will not leak key data B encrypted by the key data C set beforehand and returned from the reader/writer 513 to the reader/writer 511.

The lifetime of key data in a reader/writer after being acquired from another reader/writer can be handled as follows:

(1) Hold permanently as long as there is no explicit instruction for deletion from the controller 512

(2) Continue to hold with a time limit until a predetermined time elapses (3) Acquire from corresponding reader/writer upon necessity In the above-mentioned example, the case was illustrated of acquisition of key data required for accessing the data in the IC card 510 from another reader/writer when the data is held by another reader/writer. However, the information managed is not necessarily key data and may be various types of information. FIG. 27 is an example of an information management area in the case where the fact that data other than key data is also handled is considered.

FIG. 27 shows that two IC card access key data are held and the accessible areas are data A and data B. The attribute column shows where the original information is. "Own" indicates presence in its own apparatus. It is learned that the IC card access key data of the data B is obtained from the reader/writer B. The information obtained from other than its own apparatus, as described above, varies in information management area according to the handling of the set lifetime.

Up to here, the example of two reader/writers was envisioned, but there may also be three or more. Communication among reader/writers is also possible in a broader network environment. FIG. 28 is a view for showing an example of the configuration when using the above.

Up to here, linkage units are connected to reader/writers one to one, but in FIG. 28, they are connected to the Internet or other public network. Here, if the key data required when the reader/writer 611 and reader/writer 613 communicate linked together is the key data AB and the key data required when the reader/writer 611 and reader/writer 614 communicate linked together is the key data AC, not only is it not possible to eavesdrop on the communication between them, but also it is possible to prevent unauthorized access where for example the reader/writer 613 obtains information from the reader/writer C without permission.

As described above, according to the present invention, it is possible to provide a communications method, a data processing apparatus, and a program thereof enabling a plurality of data processing apparatuses (SAM) to quickly provide services linked together.

Further, according to the present invention, it is possible to provide a communications method, a data processing apparatus, and a program thereof enabling data processing apparatuses storing data and programs relating to provision of services by different service businesses to suitably manage data to be confidential from other parties and data to be disclosed to the public.

INDUSTRIAL APPLICABILITY

The present invention can be applied to a data processing apparatus, a method thereof and a program thereof used for provision of services using an integrated circuit (IC).

The invention claimed is:

1. A data processing method for transferring data between a first data processing apparatus executing a first application program and a second data processing apparatus executing a second application program, comprising the steps of:

storing, at said first data processing apparatus, first management data indicating a data module which said first application program uses among a plurality of data modules forming said second application program;

storing, at said second data processing apparatus, second management data indicating a data module permitted to be used by said first application program;

referring to said first management data and sending a request designating said data module intended to be used by said first data processing apparatus to said second data processing apparatus; and referring to said second management data in accordance with said request and, when judging that said data module designated by said request is allowed to be used by said first application program, sending the data module specified in said request to said first data processing apparatus from said second data processing apparatus.

2. A communications method as set forth in claim 1, further comprising the steps of, sending by a first server apparatus a first request to said first data processing apparatus; and referring by said first server apparatus to said first management data in accordance with said first request and sending a second request designating said data module intended to be used to said second data processing apparatus, wherein said first data processing apparatus is connected to said first server apparatus, said second data processing apparatus is connected to a second server apparatus, and said first data processing apparatus and said second data processing apparatus communicate via said first server apparatus and said second server apparatus.

3. A communications method as set forth in claim 2, further comprising the steps of:

confirming whether said data module to be used by said first application program is in a condition usable in said second data processing apparatus;

notifying the confirmed result to said first server apparatus by said second server apparatus; and sending by said first server apparatus said first request in accordance with said notification to said first data processing apparatus.

4. A communications method as set forth in claim 1, further comprising the steps of:

performing mutual authentication between said first data processing apparatus and said second data processing apparatus; and sending said request from said first data processing apparatus to said second data processing apparatus.

5. A data processing method for transferring data between a first data processing apparatus executing a first application program and a second data processing apparatus executing a second application program, comprising the steps of:

when said first data processing apparatus holds first management data indicating a data module which said first application program uses among a plurality of data modules forming said second application program and said second data processing apparatus holds second management data indicating a data module allowed to be used for said first application program, referring to said first management data and sending a request designating said data module intended to be used to said data processing apparatus by said first data processing apparatus;

referring to said second management data in accordance with said request and, when judging that said data module designated by said request is allowed to be used by said first application program, sending the data module specified in said request to said first data processing apparatus by said second data processing apparatus;

having said first data processing apparatus and said second data processing apparatus mutually authenticate each other and, after confirming the legitimacy of the other party, and having said first data processing apparatus send said second data processing apparatus said request; and holding by said first data processing apparatus said first management data storing key data used for mutual authentication with said second data processing apparatus for using said data module;

holding by said second data processing apparatus said second management data storing key data used for mutual authentication with said first data processing apparatus for causing said data module to be used by said first application program; and having said first data processing apparatus and said second data processing apparatus mutually authenticate each other using key data stored in said first management data and said second management data.

6. A data processing method for transferring data between a first data processing apparatus executing a first application program and a second data processing apparatus executing a second application program, comprising the steps of:

when said first data processing apparatus holds first management data indicating a data module which said first application program uses among a plurality of data modules forming said second application program and said second data processing apparatus holds second management data indicating a data module allowed to be used for said first application program, referring to said first management data and sending a request designating said data module intended to be used to said data processing apparatus by said first data processing apparatus;

referring to said second management data in accordance with said request and, when judging that said data module designated by said request is allowed to be used by said first application program, sending the data module specified in said request to said first data processing apparatus by said second data processing apparatus;

having said first data processing apparatus and said second data processing apparatus mutually authenticate each other and, after confirming the legitimacy of the other party, and having said first data processing apparatus send said second data processing apparatus said request;

having said first management data and said second management data store mutual authentication instruction data for designating whether to perform said mutual authentication; and having said first data processing apparatus and said second data processing apparatus refer to the mutual authentication instruction data to determine whether to perform said mutual authentication.

7. A communications method as set forth in claim 5, further comprising the steps of having said first data processing apparatus end mutual authentication using said key data, then sending said request to said second data processing apparatus, then, without mutual authentication again, sending a request designating another module linked with said key data to said second data processing apparatus.

8. A data processing method for transferring data between a first data processing apparatus executing a first application program and a second data processing apparatus executing a second application program, comprising the steps of:

when said first data processing apparatus holds first management data indicating a data module which said first application program uses among a plurality of data modules forming said second application program and said second data processing apparatus holds second management data indicating a data module allowed to be used for said first application program, referring to said first management data and sending a request designating said data module intended to be used to said data processing apparatus by said first data processing apparatus;

referring to said second management data in accordance with said request and, when judging that said data module designated by said request is allowed to be used by said first application program, sending the data module specified in said request to said first data processing apparatus by said second data processing apparatus;

holding by said second data processing apparatus said second management data storing data defining a mode of use of said data module to be used by said first application program; and having said second data processing apparatus refer to said second management data and permit use of said data module by said first application program within the range of mode of use defined.

9. A data processing method for transferring data between a first data processing apparatus executing a first application program and a second data processing apparatus executing a second application program, comprising the steps of:

when said first data processing apparatus holds first management data indicating a data module which said first application program uses among a plurality of data modules forming said second application program and said second data processing apparatus holds second management data indicating a data module allowed to be used for said first application program, referring to said first management data and sending a request designating said data module intended to be used to said data processing apparatus by said first data processing apparatus;

referring to said second management data in accordance with said request and, when judging that said data module designated by said request is allowed to be used by said first application program, sending the data module specified in said request to said first data processing apparatus by said second data processing apparatus;

holding by said second data processing apparatus said second management data further defining a party permitting the setting of said second management data; and permitting by said second data processing apparatus the setting of said second management data only to a party defined in said second management data.

10. A data processing method for transferring data between a first data processing apparatus executing a first application program and a second data processing apparatus executing a second application program, comprising the steps of:

when said first data processing apparatus holds first management data indicating a data module which said first application program uses among a plurality of data modules forming said second application program and said second data processing apparatus holds second management data indicating a data module allowed to be used for said first application program, referring to said first management data and sending a request designating said data module intended to be used to said data processing apparatus by said first data processing apparatus;

referring to said second management data in accordance with said request and, when judging that said data module designated by said request is allowed to be used by said first application program, sending the data module specified in said request to said first data processing apparatus by said second data processing apparatus;

holding by said first data processing apparatus said first management data including tag data indicating the content or application of a data module forming said first application program; and holding by said second data processing apparatus said second management data including tag data indicating the content or application of a data module forming said second application program.

11. A data processing method for transferring data between a first data processing apparatus executing a first application program and a second data processing apparatus executing a second application program, comprising the steps of:

when said first data processing apparatus holds first management data indicating a data module which said first application program uses among a plurality of data modules forming said second application program and said second data processing apparatus holds second management data indicating a data module allowed to be used for said first application program, referring to said first management data and sending a request designating said data module intended to be used to said data processing apparatus by said first data processing apparatus;

referring to said second management data in accordance with said request and, when judging that said data module designated by said request is allowed to be used by said first application program, sending the data module specified in said request to said first data processing apparatus by said second data processing apparatus;

holding by said first data processing apparatus said first management data including data for managing use of a port defined in said first application program in response to a right or application;

holding by said second data processing apparatus said second management data including data for managing use of a port defined in said second application program in response to a right or application;

managing by said first data processing apparatus use of a port defined in said first application program in response to a right or application; and managing by said second data processing apparatus use of a port defined in said second application program in response to a right or application.

12. A data processing method for transferring data between a first data processing apparatus executing a first application program and a second data processing apparatus executing a second application program, comprising the steps of:

when said first data processing apparatus holds first management data indicating a data module which said first application program uses among a plurality of data modules forming said second application program and said second data processing apparatus holds second management data indicating a data module allowed to be used for said first application program, referring to said first management data and sending a request designating said data module intended to be used to said data processing apparatus by said first data processing apparatus;

referring to said second management data in accordance with said request and, when judging that said data module designated by said request is allowed to be used by said first application program, sending the data module specified in said request to said first data processing apparatus by said second data processing apparatus;

sending by said first data processing apparatus a request designating the type of said data module intended to be used to said second data processing apparatus; and sending by said second data processing apparatus a data module corresponding to said specified type of data module to said first data processing apparatus.

13. A data processing method for transferring data between a first data processing apparatus executing a first application program and a second data processing apparatus executing a second application program, comprising the steps of:

when said first data processing apparatus holds first management data indicating a data module which said first application program uses among a plurality of data modules forming said second application program and said second data processing apparatus holds second management data indicating a data module allowed to be used for said first application program, referring to said first management data and sending a request designating said data module intended to be used to said data processing apparatus by said first data processing apparatus;

referring to said second management data in accordance with said request and, when judging that said data module designated by said request is allowed to be used by said first application program, sending the data module specified in said request to said first data processing apparatus by said second data processing apparatus;

sending by said second data processing apparatus together with data module relating to said request, data indicating whether either temporary use or storage and use of said data module by said first data processing apparatus is permitted, to said first data processing apparatus; and temporarily using or storing and using by said first data processing apparatus a data module received from said second data processing apparatus based on the data.

14. A data processing method for transferring data between a first data processing apparatus executing a first application program and a second data processing apparatus executing a second application program, comprising the steps of:

when said first data processing apparatus holds first management data indicating a data module which said first application program uses among a plurality of data modules forming said second application program and said second data processing apparatus holds second management data indicating a data module allowed to be used for said first application program, referring to said first management data and sending a request designating said data module intended to be used to said data processing apparatus by said first data processing apparatus;

referring to said second management data in accordance with said request and, when judging that said data module designated by said request is allowed to be used by said first application program, sending the data module specified in said request to said first data processing apparatus by said second data processing apparatus;

having said first data processing apparatus and said second data processing apparatus communicate with an integrated circuit via said server apparatus to provide predetermined services; and having said data module indicate data or a routine for operating a memory area of said integrated circuit.

15. A data processing method for transferring data between a first data processing apparatus executing a first application program and a second data processing apparatus executing a second application program, comprising the steps of:

when said first data processing apparatus holds first management data indicating a data module which said first application program uses among a plurality of data modules forming said second application program and said second data processing apparatus holds second management data indicating a data module allowed to be used for said first application program, referring to said first management data and sending a request designating said data module intended to be used to said data processing apparatus by said first data processing apparatus;

referring to said second management data in accordance with said request and, when judging that said data module designated by said request is allowed to be used by said first application program, sending the data module specified in said request to said first data processing apparatus by said second data processing apparatus; and having said first data processing apparatus and said second data processing apparatus simultaneously set a plurality of communication paths for transfer of said data module.

16. A data processing apparatus for transferring data with another data processing apparatus executing a first application program and for executing a second application program, comprising:

an interface for transferring data with said other data processing apparatus, a memory means for storing a plurality of data modules forming said second application program and management data indicating a data module allowed to be used in said first application program, and a processing means for referring to said management data in accordance with a request from said other data processing apparatus and, when judging a data module relating to said request is permitted to be used by said first application program, reading out the data module relating to said request from said memory means and sending it to said other data processing apparatus.

17. A data processing apparatus as set forth in claim 16, wherein said processing means performs mutual authentication with said other data processing apparatus and, after they confirm the legitimacy of each other, receives a request from said other data processing apparatus and sends a data module relating to the request to said other data processing apparatus.

18. A data processing apparatus as set forth in claim 16, wherein:

said memory means stores said management data storing data defining a mode of use of said data module by said first application program, and said processing means refers to said management data and permits use of said data module by said first application program in the range of mode of use defined.

19. A data processing apparatus as set forth in claim 16, wherein:

said processing means communicates with an integrated circuit to provide a predetermined service, and said memory means stores said data module indicating data or a routine for operating a memory area in said integrated circuit.

20. A program to be executed by a data processing apparatus for transferring data with another data processing apparatus executing a first application program and for executing a second application program, comprising:

a routine receiving from said other data processing apparatus a request for use of a data module, a routine referring to management data indicating a data module permitted to be used by said first application program in accordance with said request and judging whether to permit said first application program to use the data module relating to said request, and a routine sending a data module relating to said request to said other data processing apparatus when judging it permissible.

* * * * *